US012797806B2

(12) United States Patent
Sayama et al.

(10) Patent No.: US 12,797,806 B2
(45) Date of Patent: Nov. 17, 2026

(54) SEPARATION MEMBRANE AND METHOD FOR MANUFACTURING SAME

(71) Applicant: NITTO DENKO CORPORATION, Ibaraki (JP)

(72) Inventors: Shunsuke Sayama, Ibaraki (JP); Kensuke Tani, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 560 days.

(21) Appl. No.: 18/281,139

(22) PCT Filed: Jan. 12, 2022

(86) PCT No.: PCT/JP2022/000730

§ 371 (c)(1),
(2) Date: Mar. 7, 2024

(87) PCT Pub. No.: WO2022/190612

PCT Pub. Date: Sep. 15, 2022

(65) Prior Publication Data

US 2024/0416291 A1 Dec. 19, 2024

(30) Foreign Application Priority Data

Mar. 9, 2021 (JP) ................................ 2021-037657
Jul. 21, 2021 (JP) ................................ 2021-120774

(51) Int. Cl.
*B01D 69/12* (2006.01)
*B01D 53/22* (2006.01)
(Continued)

(52) U.S. Cl.
CPC ............ *B01D 69/12* (2013.01); *B01D 69/02* (2013.01); *B01D 71/70* (2013.01); *B01D 71/80* (2013.01);
(Continued)

(58) Field of Classification Search
None
See application file for complete search history.

(56) References Cited

U.S. PATENT DOCUMENTS 4,244,844 A 1/1981 Molinier et al.
7,165,682 B1 1/2007 Ji
(Continued)

FOREIGN PATENT DOCUMENTS

CN 105879699 A 8/2016
CN 110605031 A 12/2019
(Continued)

OTHER PUBLICATIONS

The Extended European Search Report dated Oct. 16, 2024 for corresponding European Patent Application No. 22766580.9 (12 pages).

(Continued)

*Primary Examiner* — Gabriel E Gitman
(74) *Attorney, Agent, or Firm* — Hauptman Ham, LLP

(57) ABSTRACT

The present invention provides a separation membrane suitable for suppressing variation in separation performance. A separation membrane of the present invention includes a separation functional layer, a porous support member supporting the separation functional layer, and an intermediate layer that is disposed between the separation functional layer and the porous support member and is formed from an emulsion resin composition. The emulsion resin composition includes, for example, a silicone-based polymer, a hydrophilic polymer, etc.

15 Claims, 4 Drawing Sheets

(51) Int. Cl.
*B01D 69/02* (2006.01)
*B01D 71/70* (2006.01)
*B01D 71/80* (2006.01)

(52) U.S. Cl.
CPC ...... *B01D 53/228* (2013.01); *B01D 2257/504* (2013.01); *B01D 2323/12* (2013.01); *B01D 2325/04* (2013.01); *B01D 2325/36* (2013.01); *B32B 2270/00* (2013.01)

(56) References Cited

U.S. PATENT DOCUMENTS

| | | | | |
|---|---|---|---|---|
| 10,173,180 | B2 * | 1/2019 | Hiraki | B01D 69/1216 |
| 11,911,725 | B2 * | 2/2024 | Yoshimura | B01D 53/228 |
| 2015/0151244 | A1 * | 6/2015 | Ishizuka | B01D 61/38 422/212 |
| 2015/0217236 | A1 * | 8/2015 | Nishimura | B01D 53/228 427/244 |
| 2015/0270523 | A1 * | 9/2015 | Toyoda | H01M 50/403 427/58 |
| 2016/0243507 | A1 | 8/2016 | Hiraki et al. | |
| 2019/0270053 | A1 * | 9/2019 | Abdelkader | B01D 67/00791 |
| 2020/0061530 | A1 * | 2/2020 | Takemoto | B01D 53/228 |
| 2022/0161185 | A1 | 5/2022 | Yoshimura et al. | |
| 2022/0161204 | A1 * | 5/2022 | Wheelwright | B01D 67/0006 |
| 2024/0017233 | A1 * | 1/2024 | Nakama | B01J 4/008 |

FOREIGN PATENT DOCUMENTS

| | | | | |
|---|---|---|---|---|
| CN | 111111471 | A | 5/2020 | |
| CN | 111871235 | A | 11/2020 | |
| EP | 0 174 918 | A1 | 3/1986 | |
| EP | 0242069 | A2 * | 10/1987 | B01D 71/707 |
| JP | S61-54222 | A | 3/1986 | |
| JP | S62-294420 | A | 12/1987 | |
| JP | H4-104806 | A | 4/1992 | |
| JP | 2002-282629 | A | 10/2002 | |
| JP | 2004-339283 | A | 12/2004 | |
| JP | 2009-241006 | A | 10/2009 | |
| JP | 2015-127036 | A | 7/2015 | |
| JP | 6186286 | B2 | 8/2017 | |
| JP | 2019-209274 | A | 12/2019 | |
| JP | 2020-163375 | A | 10/2020 | |

OTHER PUBLICATIONS

Peter A. Lovell et al., “Fundamentals of Emulsion Polymerization”, Biomacromolecules, vol. 21, No. 11, 2020 American Chemical Society, pp. 4396-4441.

Office Action issued on Nov. 4, 2025 for corresponding Japanese Patent Application No. 2023-505148, along with an English machine translation (23 pages).

International Search Report issued on Mar. 22, 2022, for corresponding International Patent Application No. PCT/JP2022/000730, along with an English translation (7 pages).

Written Opinion issued on Mar. 22, 2022, for corresponding International Patent Application No. PCT/JP2022/000730, along with an English translation (14 pages).

Office Action issued on Dec. 12, 2025 along with its English machine translation and Search Report along with its English translation for corresponding Chinese Patent Application No. 202280019781.1 (20 pages).

Office Action issued for corresponding Japanese Patent Application No. 2023-505148 on Mar. 10, 2026, along with an English machine translation (10 pages).

Office Action issued for corresponding Chinese Patent Application No. 202280019781.1 on Jul. 6, 2026 along with an English machine translation (15 pages).

* cited by examiner

SEPARATION MEMBRANE AND METHOD FOR MANUFACTURING SAME

CROSS REFERENCE TO RELATED APPLICATION

This application is a National Stage of International Application No. PCT/JP2022/000730, filed on Jan. 12, 2022, which designates the United States and was published in Japan, and which is based upon and claims priority to Japanese Patent Application No. 2021-037657, filed on Mar. 9, 2021 and Japanese Patent Application No. 2021-120774, filed on Jul. 21, 2021, in the Japan Patent Office. All of the aforementioned applications are hereby incorporated by reference in their entireties.

TECHNICAL FIELD

The present invention relates to a separation membrane and a method for manufacturing the same.

BACKGROUND ART

A membrane separation method has been developed as a method for separating an acid gas such as carbon dioxide from a gas mixture containing the acid gas. The membrane separation method allows an efficient separation of an acid gas with a suppressed operation cost, compared with an absorption method according to which an acid gas contained in a gas mixture is absorbed by an absorbent to be separated.

Separation membranes used in the membrane separation method include a composite membrane in which a separation functional layer is formed on a porous support member. In the field of separation membranes, an intermediate layer may be disposed between the separation functional layer and the porous support member in order to reduce the membrane thickness of the separation functional layer (Patent Literatures 1 and 2, for example).

CITATION LIST

Patent Literature

Patent Literature 1: JP 6186286 B
Patent Literature 2: JP 2019-209274 A

SUMMARY OF INVENTION

Technical Problem

Conventional separation membranes are required to have suppressed variation in separation performance among different measurement points.

Therefore, the present invention provides a separation membrane suitable for suppressing variation in separation performance.

Solution to Problem

An intermediate layer can be produced by, for example, applying a solution containing a material of the intermediate layer onto a porous support member and drying the obtained coating film. However, according to studies by the present inventors, the above-mentioned solution applied onto the porous support member tends to enter into the porous support member. The entry of the solution into the porous support member causes not only variation in the thickness of the intermediate layer but also a defect in the formed intermediate layer. The present inventors have newly found that variation occurs in separation performance of a separation membrane when a separation functional layer is further formed on the intermediate layer formed by the above-mentioned method, and they have completed the present invention.

The present invention provides a separation membrane including:

a separation functional layer;

a porous support member supporting the separation functional layer; and an intermediate layer that is disposed between the separation functional layer and the porous support member and is formed from an emulsion resin composition.

The present invention further provides a method for manufacturing a separation membrane including a separation functional layer, a porous support member supporting the separation functional layer, and an intermediate layer that is disposed between the separation functional layer and the porous support member, the method including:

applying an emulsion resin composition onto the porous support member and thereby forming a coating film; and drying the coating film and thereby forming the intermediate layer.

The present invention further provides a separation membrane including:

a separation functional layer;

a porous support member supporting the separation functional layer; and an intermediate layer that is disposed between the separation functional layer and the porous support member and includes a silicone-based polymer and a hydrophilic polymer.

Advantageous Effects of Invention

The present invention can provide a separation membrane suitable for suppressing variation in separation performance.

DESCRIPTION OF EMBODIMENTS

The present invention will be described in detail below. The following description is not intended to limit the present invention to a specific embodiment.

<Embodiment of Separation Membrane>

Figure 1:
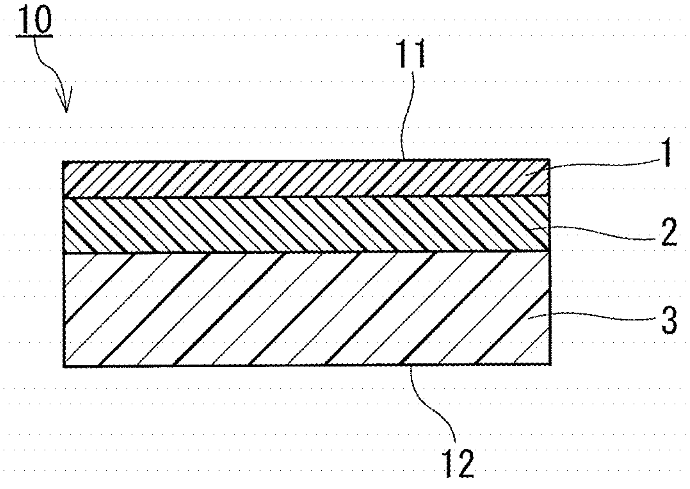
FIG. 1 is a cross-sectional view illustrating schematically a separation membrane according to one embodiment of the present invention.

As shown in FIG. 1, a separation membrane 10 of the present embodiment includes a separation functional layer 1, an intermediate layer 2, and a porous support member 3. The intermediate layer 2 is disposed between the separation functional layer 1 and the porous support member 3, and is in direct contact with each of the separation functional layer 1 and the porous support member 3. The intermediate layer 2 is formed from an emulsion resin composition.

(Separation Functional Layer)

The separation functional layer 1 is, for example, a layer capable of allowing an acid gas contained in a gas mixture to preferentially permeate therethrough. In a preferred embodiment, the separation functional layer 1 includes a resin. Examples of the resin included in the separation functional layer 1 include a polyether block amide resin, a polyamide resin, a polyether resin, a polyimide resin, a cellulose acetate resin, a silicone resin, and a fluorine resin. The separation functional layer 1 preferably includes a polyether block amide resin. In this embodiment, the separation functional layer 1 is preferably composed substantially of a resin. In the present description, the phrase "composed substantially of" means exclusion of other component that alters essential characteristics of a material referred to, and for example means that 95 wt % or more or even 99 wt % or more is composed of the material. Note that the separation functional layer 1 may further include an additive, such as a leveling agent, besides the resin.

In another preferred embodiment, the separation functional layer 1 includes an ionic liquid. The separation functional layer 1 includes, for example, a double-network gel including an ionic liquid. The double-network gel is a gel including two types of network structures independent from each other. The double-network gel includes, for example, a first network structure composed mainly of an organic material, a second network structure composed mainly of an inorganic material, and an ionic liquid. In the present description, the phrase "composed mainly of" means that 50 wt % or more or even 70 wt % or more is composed of the material.

The organic material for constituting the first network structure includes, for example, a polymer such as polyacrylamide (particularly, polydialkylacrylamide such as polydimethylacrylamide). The polymer included in the organic material may have a structural unit derived from an acrylamide derivative and may further include a cross-linked structure. The polymer including a cross-linked structure can be produced by a known method. First, a prepolymer having a structural unit having an N-hydroxysuccinimide ester group is prepared, for example. The structural unit having an N-hydroxysuccinimide ester group derives from N-acryloxysuccinimide, for example. Next, the prepolymer is allowed to react with an amine-based cross linking agent to obtain a polymer including a cross-linked structure. The amine-based cross linking agent is a compound, such as ethylene glycol bis(3-aminopropyl) ether, having two or more primary amino groups.

The second network structure may include a network of a plurality of particles. The network of the plurality of particles are formed by, for example, the plurality of particles being bonded to each other by hydrogen bonds. The particles included in the second network structure may include an inorganic material. The particles included in the second network structure may include an organic material. Examples of the inorganic material included in the particles include silica, titania, and alumina. In one example, the particles included in the second network structure are silica particles.

In the present embodiment, examples of the ionic liquid include an ionic liquid having: imidazolium, pyridinium, ammonium, or phosphonium; and a substituent having 1 or more carbon atoms.

In an ionic liquid having imidazolium and a substituent having 1 or more carbon atoms, examples of the substituent having 1 or more carbon atoms include an alkyl group having 1 to 20 carbon atoms, a cycloalkyl group having 3 to 14 carbon atoms, and an aryl group having 6 to 20 carbon atoms, and these may be each further substituted by a hydroxy group, a cyano group, an amino group, a monovalent ether group, or the like (for example, a hydroxyalkyl group having 1 to 20 carbon atoms).

Examples of the alkyl group having 1 to 20 carbon atoms include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, an n-eicosadecyl group, an i-propyl group, a sec-butyl group, an i-butyl group, a 1-methylbutyl group, a 1-ethylpropyl group, a 2-methylbutyl group, an i-pentyl group, a neopentyl group, a 1,2-dimethylpropyl group, a 1,1-dimethylpropyl group, a t-pentyl group, a 2-ethylhexyl group, and a 1,5-dimethylhexyl group. These may be each further substituted by a hydroxy group, a cyano group, an amino group, a monovalent ether group, or the like.

The above alkyl group may be substituted by a cycloalkyl group. The number of carbon atoms in the alkyl group substituted by the cycloalkyl group is, for example, 1 or more and 20 or less. Examples of the alkyl group substituted by the cycloalkyl group include a cyclopropyl methyl group, a cyclobutyl methyl group, a cyclohexyl methyl group, and a cyclohexyl propyl group. These may be each further substituted by a hydroxy group, a cyano group, an amino group, a monovalent ether group, or the like.

Examples of the cycloalkyl group having 3 to 14 carbon atoms include a cyclopropyl group, a cyclobutyl group, a cyclopentyl group, a cyclohexyl group, a cycloheptyl group, a cyclooctyl group, a cyclododecyl group, a norbornyl group, a bornyl group, and an adamantyl group. These may be each further substituted by a hydroxy group, a cyano group, an amino group, a monovalent ether group, or the like.

Examples of the aryl group having 6 to 20 carbon atoms include a phenyl group, a toluyl group, a xylyl group, a mesityl group, an anisyl group, a naphthyl group, and a benzyl group. These may be each further substituted by a hydroxy group, a cyano group, an amino group, a monovalent ether group, or the like.

A compound having imidazolium and a substituent having 1 or more carbon atoms may further have a substituent such as an alkyl group, and may form a salt with a counter anion. Examples of the counter anion include alkyl sulfate, tosylate, methanesulfonate, acetate, bis(fluorosulfonyl)imide, bis(trifluoromethanesulfonyl)imide, thiocyanate, dicyanamide, tricyanomethanide, tetracyanoborate, hexafluorophosphate, tetrafluoroborate, and halide. From the viewpoint of gas separation performance, preferred are bis(fluorosulfonyl)imide, bis(trifluoromethanesulfonyl)imide, dicyanamide, tricyanomethanide, and tetracyanoborate.

Specific examples of the ionic liquid having imidazolium and a substituent having 1 or more carbon atoms include 1-ethyl-3-methylimidazolium bis(fluorosulfonyl)imide, 1-ethyl-3-methylimidazolium dicyanamide, 1-butyl-3-methylimidazolium bromide, 1-butyl-3-methylimidazolium chloride, 1-butyl-3-methylimidazolium tetrafluoroborate, 1-butyl-3-methylimidazolium hexafluorophosphate, 1-butyl-3-methylimidazolium trifluoromethanesulfonate, 1-butyl-3-methylimidazolium tetrachloroferrate, 1-butyl-3-methylimidazolium iodide, 1-butyl-2,3-dimethylimidazolium chloride, 1-butyl-2,3-dimethylimidazolium hexafluorophosphate, 1-butyl-2,3-dimethylimidazolium tetrafluoroborate, 1-butyl-3-methylimidazolium bis(trifluoromethanesulfonyl)imide, 1-butyl-2,3-dimethylimidazolium bis(trifluoromethanesulfonyl)imide, 1-butyl-2,3-dimethylimidazolium bis(trifluoromethanesulfonyl) imide, 1-butyl-3-methylimidazolium trifluoro (trifluoromethyl) borate, 1-butyl-3-methylimidazolium tribromide, 1,3-dimesitylimidazolium chloride, 1,3-bis(2,6-diisopropylphenyl) imidazolium chloride, 1,3-diisopropylimidazolium tetrafluoroborate, 1,3-di-tert-butylimidazolium tetrafluoroborate, 1,3-dicyclohexylimidazolium tetrafluoroborate, 1,3-dicyclohexylimidazolium chloride, 1,2-dimethyl-3-propylimidazolium iodide, 1-hexyl-3-methylimidazolium chloride, 1-hexyl-3-methylimidazolium hexafluorophosphate, 1-hexyl-3-methylimidazolium tetrafluoroborate, 1-hexyl-3-methylimidazolium bromide, 1-methyl-3-propylimidazolium iodide, 1-methyl-3-n-octylimidazolium bromide, 1-methyl-3-n-octylimidazolium chloride, 1-methyl-3-n-octylimidazolium hexafluorophosphate, 1-methyl-3-[6-(methylsulfinyl) hexyl]imidazolium p-toluenesulfonate, 1-ethyl-3-methylimidazolium tricyanomethanide, and 1-(2-hydroxyethyl)-3-methylimidazolium bis(trifluoromethanesulfonyl) imide.

Among these, from the viewpoint of gas separation performance, particularly preferred are 1-ethyl-3-methylimidazolium bis(fluorosulfonyl)imide ([EMI][FSI]), 1-ethyl-3-methylimidazolium dicyanamide ([EMI][DCA]), 1-ethyl-3-methylimidazolium tricyanomethanide ([EMI][TCM]), 1-butyl-3-methylimidazolium bis(trifluoromethanesulfonyl) imide ([$C_4$mim][$TF_2$N]), and 1-(2-hydroxyethyl)-3-methylimidazolium bis(trifluoromethanesulfonyl)imide ([$C_2$OHim][$TF_2$N]).

The method for producing the double-network gel is not particularly limited, and for example, the method disclosed in E. Kamio et al., Adv. Mater, 29, 1704118 (2017) can be used.

A content of the ionic liquid in the double-network gel is, for example, 50 wt % or more, preferably 60 wt % or more, more preferably 70 wt % or more, and still more preferably 80 wt % or more. The higher the content of the ionic liquid is, the more preferentially the separation functional layer 1 can allow the acid gas contained in the gas mixture to permeate therethrough. The upper limit of the content of the ionic liquid is, for example, but not particularly limited to, 95 wt %.

A content of the first network structure composed mainly of an organic material in the double-network gel is, for example, 1 wt % or more, preferably 5 wt % or more, and more preferably 10 wt % or more. The upper limit of the content of the first network structure is 15 wt %, for example. A content of the second network structure composed mainly of an inorganic material in the double-network gel is, for example, 1 wt % or more from the viewpoint of improving the strength of the double-network gel. The upper limit of the content of the second network structure is 5 wt %, for example. The ratio of the total value of the weight of the first network structure and the weight of the second network structure with respect to the weight of the double-network gel is, for example, 2 wt % or more, preferably 5 wt % or more, and more preferably 10 wt % or more. This ratio is preferably 20 wt % or less. In this embodiment, the separation functional layer 1 is preferably composed substantially of the double-network gel.

A thickness of the separation functional layer 1 is, for example, 50 μm or less, preferably 25 μm or less, and more preferably 15 μm or less. In some cases, the thickness of the separation functional layer 1 may be 10 μm or less, 5.0 μm or less, or 2.0 μm or less. The thickness of the separation functional layer 1 may be 0.05 μm or more, or 0.1 μm or more.

(Intermediate Layer)

As described above, the intermediate layer 2 is formed from an emulsion resin composition in the present embodiment. The emulsion resin composition means a liquid containing a dispersion medium and a polymer emulsified in the dispersion medium. The emulsion resin composition preferably includes water as a dispersion medium. That is, the emulsion resin composition is preferably an oil-in-water type (O/W type) emulsion. The emulsion resin composition may include, instead of or together with water, an organic solvent as a dispersion medium. Examples of the organic solvent included in the emulsion resin composition include 2-ethylhexanol, butyl cellosolve, dipropylene glycol, ethylene glycol, propylene glycol, normal propyl alcohol, and isopropanol. From the viewpoint of dispersibility of the polymer in the emulsion resin composition, preferred are ethylene glycol and propylene glycol.

The emulsion resin composition includes a silicone-based polymer, for example. The silicone-based polymer has, for example, a structural unit A represented by the following formula (1).

[Chemical Formula 1]

(1)

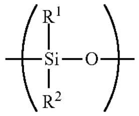

In the formulae (1), $R^1$ and $R^2$ each are independently a hydrogen atom or a hydrocarbon group. The hydrocarbon group may be linear or branched. The number of carbon atoms in the hydrocarbon group is, for example, but not particularly limited to, 1 to 5, preferably 1 to 4, and more preferably 1 to 3. The hydrocarbon group is preferably an alkyl group that is linear or branched. Examples of the alkyl group include a methyl group, an ethyl group, an n-propyl group, an isopropyl group, an n-butyl group, an isobutyl group, a sec-butyl group, and a tert-butyl group. The hydrocarbon group may be an unsaturated hydrocarbon group such as a vinyl group. $R^1$ and $R^2$ each are preferably a hydrogen atom, a methyl group, an ethyl group, or a vinyl group.

The number of the structural units A included in the silicone-based polymer is, for example, but not particularly limited to, 100 to 100000, preferably 200 to 90000, and more preferably 500 to 80000.

The silicone-based polymer includes, for example, the structural unit A as a main component, and is preferably composed substantially of the structural unit A alone. In the present description, the term "main component" means a structural unit having a largest content, on weight basis, of all the structural units constituting the silicone-based polymer. Note that the silicone-based polymer may further include a structural unit other than the structural unit A.

Specific examples of the silicone-based polymer include dimethylpolysiloxane. The silicone-based polymer may be cyclosiloxane represented by the following formula (2).

[Chemical Formula 2]

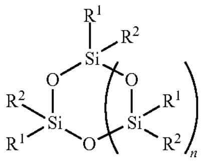

(2)

In the formula (2), $R^1$ and $R^2$ are as described in the formula (1). The number n is, for example, but not particularly limited to, 100 to 100000, preferably 200 to 90000, and more preferably 500 to 80000.

A weight-average molecular weight of the silicone-based polymer is, for example, but not particularly limited to, $1\times10^4$ to $1\times10^6$.

In the emulsion resin composition, the silicone-based polymer is dispersed in the state of particles, for example. An average particle diameter of the silicone-based polymer is, for example, but not particularly limited to, 10 to 1000 nm, and preferably 50 to 800 nm. In the present description, the average particle diameter means a median diameter determined by a particle size distribution that is measured based on a laser diffraction-scattering method with a particle size distribution measuring device. Specifically, the average particle diameter of the silicone-based polymer can be measured by a method according to ISO 13320:2009 "Particle size analysis-Laser diffraction methods" by using a laser diffraction-scattering particle size distribution measuring device (LS13 320 available from Beckman Coulter, Inc., for example).

The method for producing the emulsion resin composition including the silicone-based polymer is not particularly limited and known methods disclosed in JP 2004 339283 A and the like can be used suitably.

The emulsion resin composition may further include a surfactant for dispersing the silicone-based polymer. Examples of the surfactant include an anionic surfactant such as alkyl sulfate, alkylbenzene sulfonate, or alkyl phosphate; a nonionic surfactant such as polyoxyethylene alkyl ether, polyoxyethylene alkyl phenyl ether, or polyoxyethylene fatty acid ester; a cationic surfactant such as quarternary ammonium salt, or alkylamine acetate; and an amphoteric surfactant such as alkylbetaine or alkylimidazoline. Particularly, from the viewpoint of dispersion stability of the silicone-based polymer, it is preferable to use a nonionic surfactant such as polyoxyethylene alkyl ether or polyoxyethylene alkyl phenyl ether. Specific examples of these nonionic surfactants include polyoxyethylene octyl ether, polyoxyethylene nonyl ether, polyoxyethylene decyl ether, polyoxyethylene lauryl ether, polyoxyethylene tridecyl ether, polyoxyethylene myristyl ether, polyoxyethylene cetyl ether, polyoxyethylene stearyl ether, polyoxyethylene octylphenyl ether, polyoxyethylene nonylphenyl ether, and polyoxyethylene styrenated phenyl ether. One of these surfactants can be used alone or two or more of them can be used in combination.

The emulsion resin composition may include a hydrophilic polymer instead of or together with the silicone-based polymer. In the present description, the term "hydrophilic polymer" means a polymer having a contact angle of 100° or less, preferably 90° or less, and more preferably 85.2° or less with respect to water. The contact angle with respect to water can be determined by a sessile drop method specified in Japanese Industrial Standards (JIS) R3257:1999 by using a sheet composed of the polymer to be evaluated. The lower limit of the contact angle of the hydrophilic polymer with respect to water is, for example, but not particularly limited to, 30°, and may be 50° or 74.0°.

The hydrophilic polymer includes, for example, at least one selected from the group consisting of a urethane-based polymer, a (meth)acrylic polymer, a (meth)acrylic urethane-based polymer, an ester-based polymer, and a vinyl ester-based polymer, and preferably includes a urethane-based polymer.

Examples of the urethane-based polymer include polyurethane obtained by a reaction between polyol and polyisocyanate, and a modified product of the polyurethane. The urethane-based polymer may be a urethane prepolymer having, at an end thereof, an isocyanate group or a blocked isocyanate group.

Examples of the polyol include: polyether polyols such as polyethylene glycol, polypropylene glycol, and polyoxy tetramethylene ether glycol or the like obtained by ring-opening polymerization of ethylene oxide, propylene oxide, tetrahydrofuran or the like, respectively; saturated or unsaturated low-molecular glycols such as ethylene glycol, diethylene glycol, triethylene glycol, 1,2-propanediol, 1,3-propanediol, 1,3-butanediol, 1,4-butanediol, neopentyl glycol, pentanediol, 3-methyl-1,5-pentanediol, 1,6-hexanediol, octanediol, 1,4-butynediol, dipropylene glycol, bisphenol A, a bisphenol A propylene oxide adduct, a bisphenol A ethylene oxide adduct, and hydrogenated bisphenol A; polyester polyols obtained by dehydration condensation of the low-molecular glycols with dibasic acid such as adipic acid, maleic acid, fumaric acid, phthalic anhydride, isophthalic acid, terephthalic acid, succinic acid, oxalic acid, malonic acid, glutaric acid, pimelic acid, azelaic acid, sebacic acid, or suberic acid or with an acid anhydride corresponding to these; polyester polyols obtained by ring-opening polymerization of lactones such as ε-caprolactone and β-methyl-δ-valerolactone; and polymer polyol, such as polycarbonate polyols or polybutadiene glycols, that is commonly used for producing polyurethane. Note that, instead of the above-mentioned low-molecular glycols, various kinds of polyols such as glycerin, trimethylolpropane, trimethylolethane, 1,2,6-hexanetriol, 1,2,4-butanetriol, pentaerythritol, and sorbitol can be used. From the viewpoint of dispersibility in the emulsion resin composition, the polyols preferably have a hydrophilic moiety such as an ethyleneoxide adduct.

As the polyisocyanate, aromatic, aliphatic, or alicyclic diisocyanates can be used. Examples of the diisocyanates include 1,5-naphthylene diisocyanate, 4,4'-diphenylmethane diisocyanate, 4,4'-diphenyldimethylmethane diisocyanate, 4,4'-dibenzyl isocyanate, dialkyldiphenylmethane diisocyanate, tetraalkyldiphenylmethane diisocyanate, 1,3-phenylene diisocyanate, 1,4-phenylene diisocyanate, tolylene diisocyanate, butane-1,4-diisocyanate, hexamethylene diisocyanate, isopropylene diisocyanate, methylene diisocyanate, 2,2,4-trimethylhexamethylene diisocyanate, 2,4,4-trimethylhexamethylene diisocyanate, cyclohexane-1,4-diisocyanate, xylylene diisocyanate, isophorone diisocyanate, lysine diisocyanate, dicyclohexylmethane-4, 4'-diisocyanate, 1,3-bis(isocyanatemethyl)cyclohexane, methylcyclohexane diisocyanate, m-tetramethylxylylene diisocyanate, and dimer diisocyanate obtained by converting a carboxyl group of dimer acid into an isocyanate group.

Examples of a blocking agent for the isocyanate group include bisulfites, phenols including a sulfonic group, alcohols, lactams, oximes, and active methylene compounds.

A hydrophilic group, such as carboxylate, may be introduced into the urethane-based polymer in order to improve its dispersibility in the emulsion resin composition.

For example, the (meth)acrylic polymer has a structural unit derived from alkyl (meth)acrylate as a main component. In the present description, the term "(meth)acrylate" means acrylate and/or methacrylate.

An alkyl group included in the alkyl (meth)acrylate is, for example, but not particularly limited to, a linear, branched, or cyclic alkyl group having 2 to 14 carbon atoms.

Examples of the alkyl (meth)acrylate include acrylic acid alkyl ester having an alkyl group having 2 to 14 carbon atoms, preferably acrylic acid alkyl ester having an alkyl group having 4 to 9 carbon atoms. Examples of the acrylic acid alkyl ester include acrylic acid n-butyl, acrylic acid isobutyl, acrylic acid s-butyl, acrylic acid isoamyl, acrylic acid hexyl, acrylic acid heptyl, acrylic acid octyl, acrylic acid 2-ethylhexyl, acrylic acid isooctyl, acrylic acid nonyl, and acrylic acid isononyl.

The alkyl (meth)acrylate may be, for example, methacrylic acid alkyl ester having an alkyl group having 2 to 14 carbon atoms, preferably methacrylic acid alkyl ester having an alkyl group having 2 to 10 carbon atoms. Examples of the methacrylic acid alkyl ester include methacrylic acid ethyl, methacrylic acid propyl, methacrylic acid isopropyl, methacrylic acid n-butyl, methacrylic acid isobutyl, methacrylic acid s-butyl, methacrylic acid t-butyl, methacrylic acid 2-ethylhexyl, methacrylic acid cyclohexyl, methacrylic acid bornyl, and methacrylic acid isobornyl.

One of the above-mentioned alkyl (meth)acrylates can be used alone or two or more of them can be used in combination. A content of the structural unit derived from the alkyl (meth)acrylate in the (meth)acrylic polymer is, for example, but not particularly limited to, 70 to 100 wt %, preferably 85 to 99 wt %, and more preferably 87 to 99 wt %.

The (meth)acrylic polymer may further include a structural unit derived from a copolymerizable monomer that is copolymerizable with the alkyl (meth)acrylate. Examples of the copolymerizable monomer include: a carboxyl group-containing monomer such as acrylic acid, methacrylic acid, carboxyethyl (meth)acrylate, carboxypentyl (meth)acrylate, itaconic acid, maleic acid, fumaric acid, or crotonic acid; alkyl (meth)acrylate having an alkyl group having 1 or 15 or more carbon atoms; (meth)acrylic acid aryl ester such as (meth)acrylic acid phenyl; vinyl ester such as vinyl acetate or vinyl propionate; a styrene-based monomer such as styrene; an epoxy group-containing monomer such as (meth) acrylic acid glycidyl or (meth)acrylic acid methylglycidyl; a hydroxyl group-containing (meth)acrylate such as acrylic acid 2-hydroxyethyl or acrylic acid 2-hydroxypropyl; a nitrogen atom-containing monomer such as (meth)acrylamide, N,N-dimethyl (meth)acrylamide, N,N-diethyl (meth) acrylamide, N-isopropyl (meth)acrylamide, N-butyl (meth) acrylamide, N-methylol (meth)acrylamide, N-methylolpropane (meth)acrylamide, (meth)acryloylmorpholine, (meth)acrylic acid aminoethyl, (meth)acrylic acid N,N-dimethylaminoethyl, or (meth)acrylic acid t-butylaminoethyl; an alkoxy group-containing monomer such as (meth)acrylic acid methoxyethyl or (meth)acrylic acid ethoxyethyl; a cyano group-containing monomer such as acrylonitrile or methacrylonitrile; a functional monomer such as 2-methacryloyloxyethyl isocyanate; an olefin-based monomer such as ethylene, propylene, isoprene, butadiene, or isobutylene; a vinyl ether-based monomer such as vinyl ether; a halogen atom-containing monomer such as vinyl chloride; a vinyl group-containing heterocyclic compound such as N-vinylpyrrolidone, N-(1-methylvinyl) pyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazol, or N-vinylmorpholine; N-vinyl carboxylic amide; a maleimide-based monomer such as N-cyclohexylmaleimide, N-isopropylmaleimide, N-laurylmaleimide, or N-phenylmaleimide; an itaconimide-based monomer such as N-methyl itaconimide, N-ethyl itaconimide, N-butyl itaconimide, N-octyl itaconimide, N-2-ethylhexyl itaconimide, N-cyclohexyl itaconimide, or N-lauryl itaconimide; a succinimide-based monomer such as N-(meth)acryloyloxymethylene succinimide, N-(meth)acryloyl-6-oxyhexamethylene succinimide, or N-(meth)acryloyl-8-oxyoctamethylene succinimide; a sulfonic group-containing monomer such as styrenesulfonic acid, allylsulfonic acid, 2-(meth)acrylamide-2-methylpropanesulfonic acid, (meth)acrylamide propanesulfonic acid, sulfopropyl (meth)acrylate, or (meth)acryloyloxy naphthalenesulfonic acid; a phosphate group-containing monomer; a glycol-based acrylic ester monomer such as (meth)acrylic acid polyethylene glycol, (meth)acrylic acid polypropylene glycol, (meth)acrylic acid methoxyethylene glycol, or (meth)acrylic acid methoxypolypropylene glycol; an acrylic acid ester-based monomer having a heterocycle or a halogen atom, such as (meth)acrylic acid tetrahydrofurfuryl or fluorine (meth)acrylate; (mono or poly)alkylene glycol di(meth) acrylate such as ethylene glycol di(meth)acrylate, diethylene glycol di(meth)acrylate, triethylene glycol di(meth)acrylate, trimethylolpropane tri(meth)acrylate, tetraethylene glycol di(meth)acrylate, or propyleneglycol di(meth)acrylate; a compound obtained by esterification of (meth)acrylic acid with a polyhydric alcohol, such as neopentyl glycol di(meth) acrylate, 1,6-hexanediol di(meth)acrylate, pentaerythritol di(meth)acrylate, trimethylolpropane tri(meth)acrylate, pentaerythritol tri(meth)acrylate, or dipentaerythritol hexa(meth)acrylate; a polyfunctional vinyl compound such as divinylbenzene; and a compound having a reactive unsaturated double bond, such as (meth)acrylic acid allyl or (meth) acrylic acid vinyl.

Examples of the (meth)acrylic urethane-based polymer include a compound obtained by a reaction between (meth) acrylic polyol and polyisocyanate. Examples of the (meth) acrylic polyol include a (meth)acrylic polymer including a structural unit derived from hydroxyl group-containing (meth)acrylate. As the hydroxyl group-containing (meth) acrylate, those stated above for the (meth)acrylic polymer can be mentioned. As the polyisocyanate, those stated above for the urethane-based polymer can be mentioned. The polyisocyanate may be a urethane prepolymer having an isocyanate group.

Examples of the ester-based polymer include an ester-based polymer obtained by polycondensation of dicarboxylic acid and diol. Examples of the dicarboxylic acid include: aromatic dicarboxylic acid such as phthalic acid, isophthalic acid, terephthalic acid, 2-methylterephthalic acid, 5-sulfoisophthalic acid, 4,4'-diphenyldicarboxylic acid, 4,4'-diphenyl ether dicarboxylic acid, 4,4'-diphenyl ketone dicarboxylic acid, 4,4'-difenoxicarboxylic acid, 4,4'-diphenyl sulfone dicarboxylic acid, 1,4-naphthalenedicarboxylic acid, 1,5-naphthalenedicarboxylic acid, 2,6-naphthalenedicarboxylic acid, or 2,7-naphthalenedicarboxylic acid; alicyclic dicarboxylic acid such as 1,2-cyclohexanedicarboxylic acid, 1,3-cyclohexanedicarboxylic acid, or 1,4-cyclohexanedicarboxylic acid: aliphatic dicarboxylic acid such as malonic acid, succinic acid, glutaric acid, adipic acid, pimelic acid, suberic acid, azelaic acid, sebacic acid, or dodecanoic acid; unsaturated dicarboxylic acid such as maleic acid, maleic anhydride, or fumaric acid; and derivatives of these (lower alkyl ester of dicarboxylic acid, for example). One of these dicarboxylic acids can be used alone or two or more of them can be used in combination.

Examples of the diol include: aliphatic diol such as ethylene glycol, diethylene glycol, polyethylene glycol, propylene glycol, polypropylene glycol, 1,3-propanediol, 1,5-pentanediol, neopentyl glycol, 1,4-butanediol, 1,6-hexanediol, 1, 8-octanediol, or polyoxytetramethylene glycol; alicyclic diol such as 1,2-cyclohexanediol, 1,4-cyclohexanediol, 1,1-cyclohexanedimethylol, or 1,4-cyclohexanedimethylol; and aromatic diol such as xylylene glycol, 4,4'-dihydroxybiphenyl, 2,2-bis(4'-hydroxyphenyl) propane, or bis(4-hydroxyphenyl) sulfone. One of these diols can be used alone or two or more of them can be used in combination.

The vinyl ester-based polymer has, for example, a structural unit derived from vinyl ester. Examples of the vinyl ester include vinyl acetate and vinyl propionate. The vinyl ester-based polymer may further have a structural unit derived from olefin such as ethylene or propylene. A specific example of the vinyl ester-based polymer is an ethylene-vinyl acetate copolymer.

A weight-average molecular weight of the hydrophilic polymer is, for example, but not particularly limited to, $1\times10^4$ to $1\times10^7$.

In the emulsion resin composition, the hydrophilic polymer is dispersed in the state of particles, for example. An average particle diameter of the hydrophilic polymer is, for example, but not particularly limited to, 10 to 1000 nm, and preferably 50 to 800 nm. The average particle diameter of the hydrophilic polymer can be measured by the method mentioned above for the silicone-based polymer.

The emulsion resin composition including the hydrophilic polymer can be produced by, for example, allowing a monomer component for forming the hydrophilic polymer to be subjected to emulsion polymerization under presence of an emulsifier (a surfactant).

The emulsion resin composition may further include a surfactant for dispersing the hydrophilic polymer. As the surfactant, those stated above for the silicone-based polymer can be mentioned, for example.

The emulsion resin composition may further include another surfactant different from the above-mentioned surfactants for dispersing respectively the silicone-based polymer and the hydrophilic polymer. For example, the other surfactant can improve, depending on its type, wettability of the emulsion resin composition with respect to a metal roll included in a coater such as a gravure coater. Therefore, in the case where the emulsion resin composition includes the other surfactant, it tends to be possible to apply the emulsion resin composition uniformly by using the coater including a metal roll. The uniform application of the emulsion resin composition tends to make it possible to suppress variation in a thickness of the intermediate layer 2 formed from the emulsion resin composition.

Examples of the other surfactant include a silicone-based surfactant. The silicone-based surfactant includes, for example, a modified polysiloxane having a hydrophilic group. Example of the hydrophilic group include a hydroxyl group, a carboxylic acid group, a sulfonic acid group, a (meth)acrylic group, an ester group, and an ether group. Specific examples of a modified group of the modified polysiloxane include $—(CH_2CH_2O)_n—R$ (n is an integer of 5 to 30, and R is a hydrogen atom or an alkyl group having 1 to 6 carbon atoms) and $—(CH_2CHOHCH_2)_n—H$ (n is an integer of 5 to 30). Specific examples of the modified polysiloxane include a polyether-modified product of polydimethylsiloxane. Examples of the silicone-based surfactant include commercially available silicone-based surfactants such as "BYK" series available from BYK Japan KK, "Toray silicone" series available from Dow Corning Toray Co., Ltd., "TSF" series available from Momentive Performance Materials Japan LLC., and "KP" series and "KF" series available from Shin-Etsu Silicone.

An example of the "BYK" series available from BYK Japan KK is BYK-349. BYK-349 tends to make it possible to suppress a decrease in permeation rate of carbon dioxide permeating through the intermediate layer 2. BYK-349 has high dispersibility in water and is thus suitable for the emulsion resin composition including water as a dispersion medium.

The emulsion resin composition may further include a cross linking agent for crosslinking the silicone-based polymer and the hydrophilic polymer. For example, the emulsion resin composition may include a water-insoluble cross linking agent for crosslinking the (meth)acrylic polymer having a structural unit derived from a carboxyl group-containing monomer. The water-insoluble cross linking agent is, for example, a water-insoluble compound having two or more (2 to 6, for example, and preferably 3 to 5) functional groups that can react with a carboxyl group. In the present description, the term "water-insoluble" means that the weight in which a compound can be dissolved in 25° C., 100 parts by weight of water is 5 parts by weight or less, preferably 3 parts by mass or less, and still more preferably 2 parts by mass or less. The weight in which a compound can be dissolved in the water can be measured by the following method. First, water (25° C.) and a compound both having the same weight are mixed and stirred at a rotation speed of 300 rpm for 10 minutes by using an agitator. The obtained mixture is divided into an aqueous phase and an oil phase by centrifugal separation. Next, the aqueous phase is taken out and dried at 120° C. for 1 hour. From the loss in weight on drying, the weight of a nonvolatile substance in the aqueous phase (the weight in which the compound can be dissolved in 100 parts by weight of water) is calculated.

Each of the functional groups that can react with a carboxyl group is, for example, but not particularly limited to, an epoxy group, an isocyanate group, and a carbodiimide group. From the viewpoint of reactivity, preferred is an epoxy group. Particularly, a glycidyl amino group is preferable from the viewpoint that it has a high reactivity and is thus unlikely to leave an unreacted substance from its crosslinking reaction, which is advantageous for low pollution property. That is, as the water-insoluble cross linking agent, an epoxy-based cross linking agent having an epoxy group is preferable, particularly, a cross linking agent having a glycidyl amino group (a glycidyl amino-based cross linking agent) is preferable.

Examples of the water-insoluble cross linking agent include: a glycidyl amino-based cross linking agent such as 1,3-bis(N,N-diglycidylaminomethyl)cyclohexane (a product named "TETRAD-C" available from MITSUBISHI GAS CHEMICAL COMPANY, INC., for example) [the weight in which the product can be dissolved in 25° C., 100 parts by weight of water is 2 parts by weight or less] or 1,3-bis(N, N-diglycidylaminomethyl) benzene (a product named "TETRAD-X" available from MITSUBISHI GAS CHEMICAL COMPANY, INC., for example) [the weight in which the product can be dissolved in 25° C., 100 parts by weight of water is 2 parts by weight or less]; and another epoxy-based cross linking agent such as Tris(2,3-epoxypropyl) isocyanurate (a product named "TEPIC-G" available from Nissan Chemical Corporation, for example) [the weight in which the product can be dissolved in 25° C., 100 parts by weight of water is 2 parts by weight or less]. One of these water-insoluble cross linking agents can be used alone or two or more of them can be used in combination.

The emulsion resin composition may further include a filler. In the case where the intermediate layer 2 is formed from the emulsion resin composition including a filler, the permeation rate of carbon dioxide permeating through the intermediate layer 2 tends to be improved. The filler may include an inorganic material. The filler may include an organic material. Examples of the inorganic material included in the filler include zeolite and silica. The filler preferably has, for example, hydrophilicity and a high dispersibility in water.

The filler has a particle shape, for example. An average particle diameter of the filler is smaller than the thickness of the intermediate layer 2 formed from the emulsion resin composition. The average particle diameter of the filler is, for example, 150 nm or less, and may be 100 nm or less or 50 nm or less. The lower limit of the average particle diameter of the filler is, for example, but not particularly limited to, 1 nm. The average particle diameter of the filler can be measured by the method mentioned above for the silicone-based polymer.

The filler may have pores. An average pore diameter of the filler is, for example, but not particularly limited to, 0.1 nm to 5 nm. A density of the filler is, for example, but not particularly limited to, 0.5 to 5 g/$cm^3$.

Specific examples of the filler include "Zeoal" series available from Nakamura Choukou Co., Ltd. and "AEROSIL" series available from NIPPON AEROSIL CO., LTD. Examples of the "Zeoal" series available from Nakamura Choukou Co., Ltd. include Zeoal 4A 50 nm and Zeoal ZSM-5. These fillers include zeolite. Examples of the "AEROSIL" series available from NIPPON AEROSIL CO., LTD. include AEROSILOX50. This filler includes silica. Zeoal 4A 50 nm and AEROSILOX50 tend to have a higher hydrophilicity and a higher dispersibility in water than those of Zeoal ZSM-5.

A solid content concentration of the emulsion resin composition is, for example, but not particularly limited to, 10 to 60 wt %. In the case where the emulsion resin composition includes a surfactant, a ratio of a weight of the surfactant with respect to a weight of a total solid content in the emulsion resin composition is, for example, but not particularly limited to, 15 wt % or less, and may be 5 wt % or less or 1 wt % or less. In the case where the ratio of the weight of the surfactant is 15 wt % or less, it is possible, for example, to suppress sufficiently the entry of the emulsion resin composition into the porous support member 3 when the emulsion resin composition is applied onto the porous support member 3.

The intermediate layer 2 can be produced by, for example, removing the dispersion medium from the emulsion resin composition. Accordingly, the intermediate layer 2 includes a component derived from the emulsion resin composition. In one example, the intermediate layer 2 includes at least one selected from the group consisting of a silicone-based polymer and a hydrophilic polymer, and preferably includes both a silicone-based polymer and a hydrophilic polymer. Note that the silicone-based polymer included in the intermediate layer 2 may be a compound obtained by crosslinking the silicone-based polymer included in the emulsion resin composition. Similarly, the hydrophilic polymer included in the intermediate layer 2 may be a compound obtained by crosslinking the hydrophilic polymer included in the emulsion resin composition.

In another aspect, the present invention provides the separation membrane 10 including:

the separation functional layer 1;

the porous support member 3 supporting the separation functional layer 1; and the intermediate layer 2 that is disposed between the separation functional layer 1 and the porous support member 3 and includes a silicone-based polymer and a hydrophilic polymer.

A content of the silicone-based polymer in the intermediate layer 2 is, for example, but not particularly limited to, 10 wt % or more, preferably 30 wt % or more, more preferably 50 wt % or more, still more preferably 70 wt % or more, and particularly preferably 80 wt % or more, and it may be 90 wt % or more, 95 wt % or more, or 99 wt % or more. The intermediate layer 2 may be composed substantially of the silicone-based polymer. The higher the content of the silicone-based polymer in the intermediate layer 2 is, the higher a permeation rate of a permeated fluid from the separation membrane 10 tends to be. However, the content of the silicone-based polymer in the intermediate layer 2 may be less than 10 wt % or 5 wt % or less. The intermediate layer 2 may be substantially free of the silicone-based polymer.

A content of the hydrophilic polymer in the intermediate layer 2 is, for example, but not particularly limited to, 1 wt % or more, preferably 5 wt % or more, and more preferably 10 wt % or more. The higher the content of the hydrophilic polymer in the intermediate layer 2 is, the more the adhesion between the separation functional layer 1 and the intermediate layer 2 tends to be improved. The upper limit of the content of the hydrophilic polymer in the intermediate layer 2 is, for example, but not particularly limited to, 90 wt %, preferably 70 wt %, more preferably 50 wt %, still more preferably 30 wt %, and particularly preferably 20 wt %. It is preferable that the content of the hydrophilic polymer in the intermediate layer 2 be 10 wt % to 20 wt %. In some cases, however, the intermediate layer 2 may be composed substantially of the hydrophilic polymer or may be substantially free of the hydrophilic polymer.

The intermediate layer 2 may further include a component other than the silicone-based polymer and the hydrophilic polymer. Examples of the other component include: a surfactant derived from the emulsion resin composition; and a filler. That is, the intermediate layer 2 may include a surfactant and may include a filler. In one example, in the case where the intermediate layer 2 includes a filler, the filler is buried in a matrix including the silicone-based polymer or the hydrophilic polymer, and is preferably dispersed in the matrix. In the intermediate layer 2, the filler may aggregate partially.

A content of the surfactant in the intermediate layer 2 is, for example, but not particularly limited to, 15 wt % or less, and may be 5 wt % or less or 1 wt % or less. The lower limit of the content of the surfactant is, for example, but not particularly limited to, 0.1 wt %. A content of the filler in the intermediate layer 2 is, for example, but not particularly limited to, 60 wt % or less, and may be 40 wt % or less, 20 wt % or less, or 10 wt % or less. The lower limit of the content of the filler is, for example, but not particularly limited to, 1 wt %.

The thickness of the intermediate layer 2 is, for example, but not particularly limited to, less than 50 μm, preferably 40 μm or less, more preferably 30 μm or less, still more preferably 10 μm or less, and particularly preferably 5 μm or less. A smaller thickness of the intermediate layer 2 tends to make it possible to suppress a decrease in the permeation rate of the permeated fluid from the separation membrane 10. The lower limit of the thickness of the intermediate layer 2 is, for example, but not particularly limited to, 0.1 μm.

(Porous Support Member)

The porous support member 3 supports the separation functional layer 1 via the intermediate layer 2. Examples of the porous support member 3 include: a nonwoven fabric; porous polytetrafluoroethylene; an aromatic polyamide fiber; a porous metal; a sintered metal; a porous ceramic; a porous polyester; porous nylon; an activated carbon fiber; latex; silicone; silicone rubber; a permeable (porous) polymer including at least one selected from the group consisting of polyvinyl fluoride, polyvinylidene fluoride, polyurethane, polypropylene, polyethylene, polycarbonate, polysulfone, polyether ether ketone, polyacrylonitrile, polyimide, and polyphenylene oxide; a metallic foam having an open cell or a closed cell; a polymer foam having an open cell or a closed cell; silica; a porous glass; and a mesh screen. The porous support member 3 may be a combination of two or more of these materials. The porous support member 3 preferably includes polyvinylidene fluoride (PVDF).

The porous support member 3 has an average pore diameter of 0.01 to 0.4 μm, for example. A thickness of the porous support member 3 is, for example, but not particularly limited to, 10 μm or more, preferably 20 μm or more, and more preferably 50 μm or more. The thickness of the porous support member 3 is, for example, 300 μm or less, preferably 200 μm or less, and more preferably 150 μm or less.

(Method for Manufacturing Separation Membrane)

A method for manufacturing the separation membrane 10 of the present embodiment includes, for example: applying an emulsion resin composition onto the porous support member 3 and thereby forming a coating film; and drying the coating film and thereby forming the intermediate layer 2. The method for preparing the emulsion resin composition is not particularly limited. In one example, the emulsion resin composition may be prepared by adding a surfactant, a filler, etc. to an emulsion including a silicone-based polymer and/or a hydrophilic polymer. A slurry including a filler and a dispersion medium (water, for example) may be added to the emulsion. In the case where a slurry including a filler is added to the emulsion, aggregation of the filler tends to be suppressed in the obtained emulsion resin composition. The emulsion resin composition in which aggregation of the filler is suppressed makes it possible to suppress occurrence of a defect at the time of producing the intermediate layer 2. The method according to which the slurry including a filler is added to the emulsion also makes it possible to increase the content of the filler in the intermediate layer 2 easily.

A surface of the porous support member 3 onto which the emulsion resin composition is applied preferably has a somewhat large contact angle with respect to water. The surface of the porous support member 3 having a large contact angle with respect to water is suitable for preventing the emulsion resin composition including water as a dispersion medium from entering into the porous support member 3. The contact angle of the surface of the porous support member 3 with respect to water is, for example, 60° or more, and preferably 70° or more. The upper limit of this contact angle is, for example, but not particularly limited to, 120°. The contact angle can be determined by a sessile drop method specified in JIS R3257:1999.

The method for applying the emulsion resin composition is not particularly limited, and a method such as a spin coating method or a dip coating method can be used, for example. The emulsion resin composition may be applied, for example, using a wire bar. The method for applying the emulsion resin composition may be a method using a metal roll, such as a gravure coating method. The coating film can be dried under heating conditions, for example. The heating temperature of the coating film is, for example, 50° C. or higher. The heating time of the coating film is, for example, one minute or longer, and may be five minutes or longer. The thickness of the intermediate layer 2 can be adjusted by, for example, the solid content concentration of the emulsion resin composition and a thickness of the coating film.

A surface of the intermediate layer 2 can be subjected to an adhesion improvement treatment, if necessary. The adhesion improvement treatment is, for example, a surface treatment such as application of a primer, a corona discharge treatment, or a plasma treatment.

Next, a coating liquid containing the materials of the separation functional layer 1 is prepared. The coating liquid containing the materials of the separation functional layer 1 is applied onto the intermediate layer 2 to obtain a coating film. The coating film is dried to form the separation functional layer 1. The surface of the intermediate layer 2 onto which the coating liquid is applied preferably has a somewhat small contact angle with respect to water. The surface of the intermediate layer 2 having a small contact angle with respect to water is suitable for improving adhesion with the separation functional layer 1. The contact angle of the surface of the intermediate layer 2 with respect to water is, for example, 120° or less, and preferably 110° or less. The lower limit of this contact angle is, for example, but not particularly limited to, 70°.

The contact angle can be determined by a sessile drop method specified in JIS R3257:1999.

Furthermore, the intermediate layer 2 with the surface having a small contact angle with respect to water tends to have an excellent adhesion with the porous support member 3. In one example, a peel strength P1 of the intermediate layer 2 with respect to the porous support member 3 is, for example, 0.1 N/18 mm or more, preferably 0.2 N/18 mm or more, more preferably 0.3 N/18 mm or more, still more preferably 0.4 N/18 mm or more, and particularly preferably 0.5 N/18 mm or more. The larger the peel strength P1 is, the larger a peel strength of the separation functional layer 1 with respect to the intermediate layer 2 tends to be. The upper limit of the peel strength P1 is, for example, but not particularly limited to, 2.0 N/18 mm.

The peel strength P1 can be measured by the following method. First, a laminate of the intermediate layer 2 and the porous support member 3 to be measured is cut into a piece that is 25 mm in width and 100 in length to obtain a specimen. Next, a single-sided adhesive tape (No. 7235, 18 mm in width, available from Nitto Denko Corporation) is attached on the intermediate layer 2 included in the specimen, and a 2 kg roller is rolled thereon back and forth once so that they are press-bonded. Next, the intermediate layer 2 is peeled off, together with the single-sided adhesive tape, from the porous support member 3 at a peel angle of 90° and a peel rate of 300 mm/min by using a commercially available tensile testing machine. The peel strength at that time is determined as the peel strength P1. The above-mentioned measurement is made under a 23° C. atmosphere.

The method for applying the coating liquid and the drying conditions can be the same as the method and the conditions described above for the intermediate layer 2. The application of the coating liquid containing the materials of the separation functional layer 1 may be performed by a spin coating method. The separation functional layer 1 is formed on the intermediate layer 2 to obtain the separation membrane 10.

(Properties of Separation Membrane)

As described above, the intermediate layer 2 is formed from the emulsion resin composition in the separation membrane 10 of the present embodiment. According to the studies by the present inventors, even when the emulsion resin composition is applied onto the porous support member 3, the polymer(s) included in the emulsion resin composition is unlikely to enter into the porous support member 3. Particularly, in the case where the emulsion resin composition includes water as a dispersion medium and also the surface of the porous support member 3 has a large contact angle with respect to water, the entry of the polymer(s) into the porous support member 3 is suppressed significantly. Due to the suppression of the entry of the polymer(s) into the porous support member 3, variation in thickness and occurrence of a defect such as a pinhole are suppressed in the formed intermediate layer 2. For example, the emulsion resin composition makes it possible to produce easily the intermediate layer 2 with a relatively small thickness while suppressing variation in the thickness. In the present embodiment, the formation of the separation functional layer 1 on the intermediate layer 2 formed from the emulsion resin composition tends to suppress variation in separation performance of the separation membrane 10.

The separation membrane 10 allows, for example, an acid gas contained in a gas mixture to preferentially permeate therethrough. In one example, a permeation rate T1 of carbon dioxide permeating through the separation membrane 10 is, for example, 10 GPU or more, preferably 50 GPU or more, and more preferably 100 GPU or more. The upper limit of the permeation rate T1 is, for example, but not particularly limited to, 500 GPU. Note that GPU means $10^{-6}\cdot cm^3$ (STP)/(sec$\cdot cm^2\cdot$cmHg). The symbol "$cm^3$(STP)" means the volume of carbon dioxide at 1 atmospheric pressure and 0° C.

The permeation rate T1 can be calculated by the following method. First, a gas mixture composed of carbon dioxide and nitrogen is supplied to a space adjacent to one surface (a principal surface 11, on the separation functional layer side, of the separation membrane 10, for example) of the separation membrane 10 while a space adjacent to another surface (a principal surface 12, on the porous support member side, of the separation membrane 10) of the separation membrane 10 is decompressed. Thereby, a permeated fluid that has permeated through the separation membrane 10 can be obtained. A weight of the permeated fluid as well as a volume ratio of carbon dioxide and a volume ratio of nitrogen in the permeated fluid are measured. From the measurement results, the permeation rate T1 can be calculated. In the above-mentioned procedure, a concentration of the carbon dioxide in the gas mixture is 50 vol % under standard conditions (0° C., 101 kPa). The gas mixture supplied to the space adjacent to the one surface of the separation membrane 10 has a temperature of 30° C. and a pressure of 0.1 MPa. The space adjacent to the other surface of the separation membrane 10 is decompressed in such a manner that a pressure in the space is lower than an atmospheric pressure in a measurement environment by 0.1 MPa.

Under the above measurement conditions for the permeation rate T1, a separation factor α1 of the separation membrane 10 for carbon dioxide with respect to nitrogen is, for example, but not particularly limited to, 20 or more, and preferably 40 or more. The upper limit of the separation factor α1 is, for example, but not particularly limited to, 100. The separation factor α1 can be calculated by the following formula. It should be noted that in the following formula, $X_A$ and $X_B$ are respectively a volume ratio of the carbon dioxide and a volume ratio of the nitrogen in the gas mixture. $Y_A$ and $Y_B$ are respectively a volume ratio of the carbon dioxide and a volume ratio of the nitrogen in the permeated fluid that has permeated through the first separation membrane 10.

$$\text{Separation factor } \alpha 1=(Y_A/Y_B)/(X_A/X_B)$$

As described above, variation in separation performance is suppressed in the separation membrane 10 of the present embodiment. Specifically, in the present embodiment, a coefficient of variation of the permeation rate T1 of carbon dioxide permeating through the separation membrane 10 and a coefficient of variation of the separation factor α1 of the separation membrane 10 for carbon dioxide with respect to nitrogen tend to be small. In one example, the coefficient of variation of the permeation rate T1 of carbon dioxide permeating through the separation membrane 10 is, for example, less than 0.18, preferably 0.15 or less, more preferably 0.10 or less, and still more preferably 0.05 or less. The lower limit of the coefficient of variation of the permeation rate T1 is, for example, but not particularly limited to, 0.001. The coefficient of variation of the permeation rate T1 can be determined by the following method. First, the separation membrane 10 is cut to prepare at least three specimens. Each of the specimens is measured for the permeation rate T1 for carbon dioxide by the above-mentioned method. An average value and a standard deviation of the obtained permeation rates T1 are calculated. The ratio of the standard deviation with respect to the average value can be considered as the coefficient of variation of the permeation rate T1.

The coefficient of variation of the separation factor α1 of the separation membrane 10 for carbon dioxide with respect to nitrogen is, for example, 0.50 or less, preferably 0.40 or less, more preferably 0.30 or less, still more preferably 0.20 or less, and particularly preferably 0.10 or less. The lower limit of the coefficient of variation of the separation factor α1 is, for example, but not particularly limited to, 0.001. The coefficient of variation of the separation factor α1 can be determined by the following method. First, the separation membrane 10 is cut to prepare at least three specimens. Each of the specimens is measured for the separation factor α1 by the above-mentioned method. An average value and a standard deviation of the obtained separation factors α1 are calculated. The ratio of the standard deviation with respect to the average value can be considered as the coefficient of variation of the separation factor α1.

Furthermore, a permeation rate T2 of carbon dioxide permeating through the intermediate layer 2 is, for example, 10 GPU or more, preferably 500 GPU or more, more preferably 1000 GPU or more, still more preferably 1100 GPU or more, particularly preferably 1500 GPU or more, and especially preferably 2000 GPU or more, and may be 3000 GPU or more. The upper limit of the permeation rate T2 is, for example, but not particularly limited to, 10000 GPU. The permeation rate T2 can be measured by the same method as that for the permeation rate T1, except that a laminate of the intermediate layer 2 and the porous support member 3 is used instead of the separation membrane 10.

Under the above measurement conditions for the permeation rate T2, a separation factor «2 of the intermediate layer 2 for carbon dioxide with respect to nitrogen is, for example, but not particularly limited to, 1 or more, and preferably 5 or more. The upper limit of the separation factor $\alpha$2 is, for example, but not particularly limited to, 20. The separation factor $\alpha$2 can be calculated by the same method as that for the separation factor $\alpha$1.

The degree of variation in separation performance of the separation membrane 10 can be estimated from the degree of variation in separation performance of the intermediate layer 2. That is, the more the variation in separation performance of the intermediate layer 2 is suppressed, the more the variation in separation performance of the separation membrane 10 tends to be suppressed. A coefficient of variation of the permeation rate T2 of carbon dioxide permeating through the intermediate layer 2 is, for example, 0.50 or less, preferably 0.40 or less, more preferably 0.30 or less, still more preferably 0.20 or less, and particularly preferably 0.15 or less. The lower limit of the coefficient of variation of the permeation rate T2 is, for example, but not particularly limited to, 0.001. The coefficient of variation of the permeation rate T2 can be determined by the same method as that for the coefficient of variation of the permeation rate T1, except that a laminate of the intermediate layer 2 and the porous support member 3 is used instead of the separation membrane 10.

The separation factor $\alpha$2 of the intermediate layer 2 for carbon dioxide with respect to nitrogen is, for example, 0.40 or less, preferably 0.30 or less, more preferably 0.20 or less, and still more preferably 0.10 or less. The lower limit of the coefficient of variation of the separation factor «2 is, for example, but not particularly limited to, 0.001. The coefficient of variation of the separation factor $\alpha$2 can be determined by the same method as that for the coefficient of variation of the separation factor $\alpha$1, except that a laminate of the intermediate layer 2 and the porous support member 3 is used instead of the separation membrane 10.

In the separation membrane 10 of the present embodiment, a peel strength P2 of the separation functional layer 1 with respect to the intermediate layer 2 is, for example, but not particularly limited to, 0.4 N/10 mm or more, preferably 1.0 N/10 mm or more, more preferably 2.0 N/10 mm or more, still more preferably 3.0 N/10 mm or more, and particularly preferably 4.0 N/10 mm or more. A larger peel strength P2 tends make it possible to suppress peeling of the separation functional layer 1 from the intermediate layer 2 at the time when, for example, the separation membrane 10 is being used. The upper limit of the peel strength P2 is, for example, but not particularly limited to, 10.0 N/10 mm. The peel strength P2 of the separation functional layer 1 with respect to the intermediate layer 2 can be adjusted by, for example, the type and content of the hydrophilic polymer included in the intermediate layer 2.

The peel strength P2 can be measured by the following method. First, the separation membrane 10 to be measured is cut into a piece that is 10 mm in width and 50 mm in length to obtain a specimen. Next, a surface of the separation functional layer 1 included in the specimen is entirely laid on a polyethylene terephthalate film via a double-sided adhesive tape (No. 500 available from Nitto Denko Corporation), and a 2 kg roller is rolled thereon back and forth once so that they are press-bonded. Next, the separation functional layer 1 is peeled off, together with the film, from the intermediate layer 2 at a peel angle of 90° and a peel rate of 300 mm/min by using a commercially available tensile testing machine. The peel strength at that time is determined as the peel strength P2. The above-mentioned measurement is made under a 23° C. atmosphere. The double-sided adhesive tape (No. 500) used for the measurement of the peel strength P2 has an adhesive strength higher than that of the single-sided adhesive tape (No. 7235) used for the measurement of the peel strength P1.

As a use of the separation membrane 10 of the present embodiment, there can be mentioned the use for separating an acid gas from a gas mixture containing the acid gas. The acid gas in the gas mixture is, for example, carbon dioxide, hydrogen sulfide, carbonyl sulfide, sulfur oxide (SOx), hydrogen cyanide, and nitrogen oxide (NOx), and is preferably carbon dioxide. The gas mixture contains a gas other than the acid gas. The other gas is, for example, a nonpolar gas such as hydrogen or nitrogen or an inert gas such as helium, and is preferably nitrogen. Particularly, the separation membrane 10 of the present embodiment is suitably used for separating carbon dioxide from a gas mixture containing carbon dioxide and nitrogen. However, the use of the separation membrane 10 is not limited to the use for separating an acid gas from the above-mentioned gas mixture.

<Embodiment of Membrane Separation Device>

Figure 2:
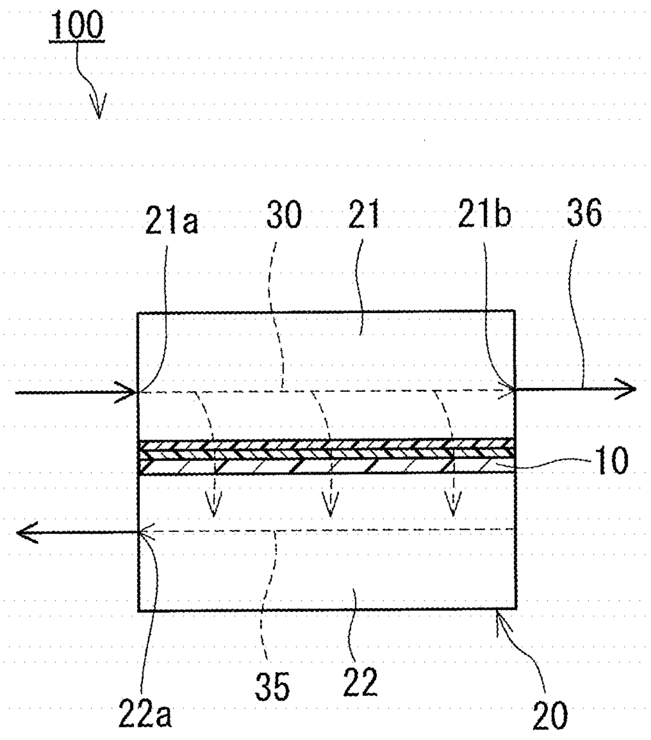
FIG. 2 is a schematic cross-sectional view of a membrane separation device including the separation membrane of the present invention.

As shown in FIG. 2, a membrane separation device 100 of the present embodiment includes the separation membrane 10 and a tank 20. The tank 20 includes a first chamber 21 and a second chamber 22. The separation membrane 10 is disposed in the tank 20. In the tank 20, the separation membrane 10 separates the first chamber 21 and the second chamber 22 from each other. The separation membrane 10 extends from one of a pair of wall surfaces of the tank 20 to the other.

The first chamber 21 has an inlet 21*a* and an outlet 21*b*. The second chamber 22 has an outlet 22*a*. The inlet 21*a*, the outlet 21*b*, and the outlet 22*a* each are, for example, an opening provided in the wall surfaces of the tank 20.

Membrane separation using the membrane separation device 100 is performed by the following method, for example. First, a gas mixture 30 containing an acid gas is supplied to the first chamber 21 via the inlet 21*a*. A concentration of the acid gas in the gas mixture 30 is, for example, but not particularly limited to, 0.01 vol % (100 ppm) or more, preferably 1 vol % or more, more preferably 10 vol % or more, still more preferably 30 vol % or more, and particularly preferably 50 vol % or more, under standard conditions. The upper limit of the concentration of the acid gas in the gas mixture 30 is, for example, but not particularly limited to, 90 vol % under standard conditions.

A pressure in the first chamber 21 may be increased by supplying the gas mixture 30. The membrane separation device 100 may further include a pump (not shown) for increasing a pressure of the gas mixture 30. The pressure of the gas mixture 30 to be supplied to the first chamber 21 is, for example, 0.1 MPa or more, and preferably 0.3 MPa or more.

A pressure in the second chamber 22 may be decreased while the gas mixture 30 is supplied to the first chamber 21. The membrane separation device 100 may further include a pump (not shown) for decreasing the pressure in the second chamber 22. The pressure in the second chamber 22 may be decreased such that a space in the second chamber 22 has a pressure lower than an atmospheric pressure in a measurement environment by, for example, 10 kPa or more, preferably 50 kPa or more, and more preferably 100 kPa or more.

Supply of the gas mixture 30 to the first chamber 21 allows to obtain, on the other surface side of the separation membrane 10, a permeated fluid 35 having a content of an acid gas higher than that in the gas mixture 30. That is, the permeated fluid 35 is supplied to the second chamber 22. The permeated fluid 35 contains, for example, an acid gas as a main component. The permeated fluid 35 may contain a small amount of a gas other than the acid gas. The permeated fluid 35 is discharged outside the tank 20 via the outlet 22*a*.

The concentration of the acid gas in the gas mixture 30 gradually decreases from the inlet 21*a* toward the outlet 21*b* in the first chamber 21. The gas mixture 30 processed in the first chamber 21 (a non-permeated fluid 36) is discharged outside the tank 20 via the outlet 21*b*.

The membrane separation device 100 of the present embodiment is suitable for a flow-type (continuous-type) membrane separation method. The membrane separation device 100 of the present embodiment may be used for a batch-type membrane separation method.

<Modification of Membrane Separation Device>

Figure 3:
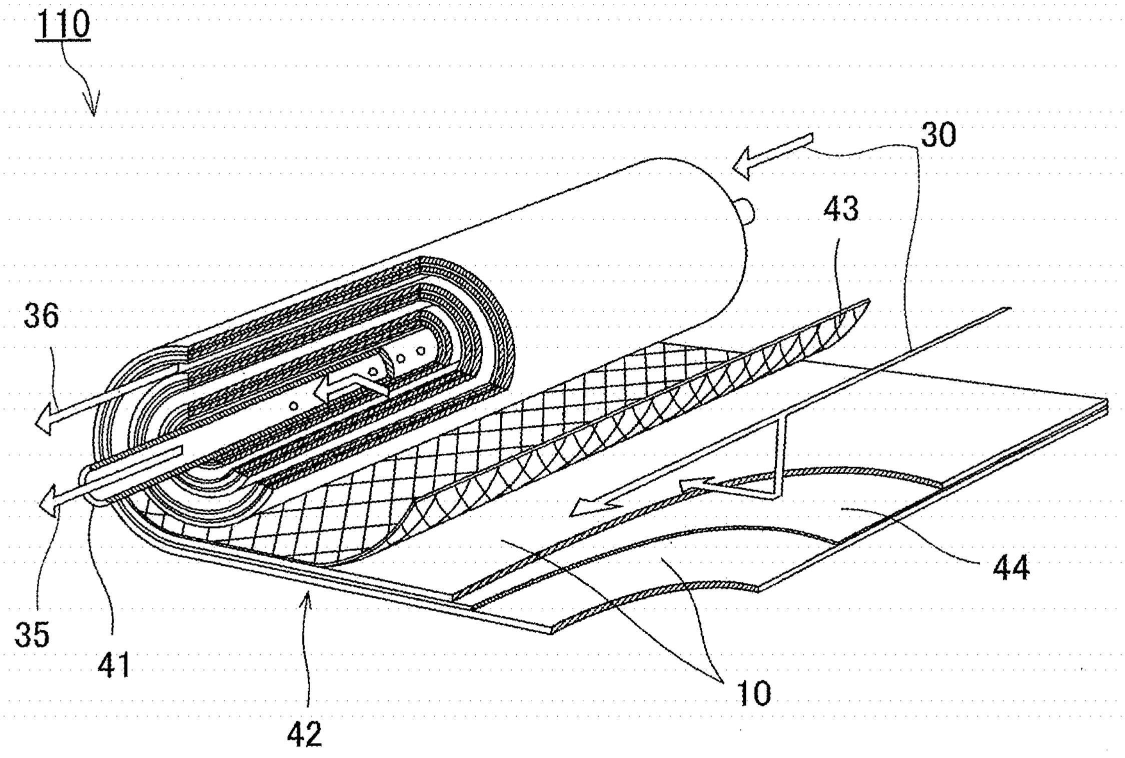
FIG. 3 is a perspective view schematically showing a modification of the membrane separation device including the separation membrane of the present invention.

As shown in FIG. 3, a membrane separation device 110 of the present embodiment includes a central tube 41 and a laminate 42. The laminate 42 includes the separation membrane 10. The membrane separation device 110 is a spiral membrane element.

The central tube 41 has a cylindrical shape. The central tube 41 has, in a surface thereof, a plurality of holes for allowing the permeated fluid 35 to flow into the central tube 41. Examples of a material of the central tube 41 include: a resin such as an acrylonitrile-butadiene-styrene copolymer resin (ABS resin), a polyphenylene ether resin (PPE resin), or a polysulfone resin (PSF resin); and a metal such as stainless steel or titanium. The central tube 41 has an inner diameter in a range of 20 to 100 mm, for example.

The laminate 42 further includes a supply-side flow passage material 43 and a permeation-side flow passage material 44 in addition to the separation membrane 10. The laminate 42 is wound around the central tube 41. The membrane separation device 110 may further include an exterior material (not shown).

For example, a resin net composed of polyphenylene sulfide (PPS) or an ethylene-chlorotrifluoroethylene copolymer (ECTFE) can be used as the supply-side flow passage material 43 and the permeation-side flow passage material 44.

Membrane separation using the membrane separation device 110 is performed by the following method, for example. First, the gas mixture 30 is supplied into one end of the wound laminate 42. The permeated fluid 35 that has permeated through the separation membrane 10 of the laminate 42 moves into the central tube 41. The permeated fluid 35 is discharged outside via the central tube 41. The gas mixture 30 processed by the membrane separation device 110 (the non-permeated fluid 36) is discharged outside from another end of the wound laminate 42. Thus, the acid gas can be separated from the gas mixture 30.

EXAMPLES

Hereinafter, the present invention will be described in more detail by way of Examples and Comparative Example, but the present invention is not limited to these examples.

Example 1

First, 1.6 g of an aqueous emulsion (POLON-MF-56 available from Shin-Etsu Chemical Co., Ltd.) including a silicone-based polymer, 0.2 g of an aqueous emulsion (NeoRez R-2170 available from DSM Coating Resins) including a urethane-based polymer as a hydrophilic polymer, and 33.3 g of ion exchange water for dilution were mixed to produce 35.0 g of an emulsion resin composition having a solid content concentration of 2 wt %. Next, by using an applicator (gap: 50 μm), the produced emulsion resin composition was applied onto a porous support member to obtain a coating film. As the porous support member, a UF membrane (ultrafiltration membrane) RS-50 (a laminate of a PVDF porous layer and a PET nonwoven fabric) available from Nitto Denko Corporation was used. The coating film was formed on the PVDF porous layer of the RS-50. The obtained coating film was dried at 130° C. for 10 minutes to form an intermediate layer with a thickness of 1 μm. In the intermediate layer, the content of the silicone-based polymer was 90 parts by weight and the content of the urethane-based polymer was 10 parts by weight.

Next, 0.7 g of a polyether block amide resin (Pebax MH1657 available from Arkema) was put in a mixed solution of 24.0 g of isopropanol and 10.3 g of water and the resultant mixture was stirred at 80° C. for 3 hours to produce 35.0 g of a coating liquid containing the polyether block amide resin at a concentration of 2 wt %. The coating liquid contained 0.01 g of a leveling agent (KP-112 available from Shin-Etsu Chemical Co., Ltd.). By using an applicator (gap: 50 μm), the produced coating liquid was applied onto the intermediate layer to obtain a coating film. Next, the obtained coating film was dried in an oven at 60° C. for 30 minutes to form a separation functional layer. Thus, a separation membrane of Example 1 was obtained.

Examples 2 to 22

Separation membranes of Examples 2 to 22 were obtained in the same manner as in Example 1, except that the type of the hydrophilic polymer and the contents of the polymers in the intermediate layer were changed as shown in Tables 1 and 2.

Example 23

A separation membrane of Example 23 was obtained in the same manner as in Example 1, except that the emulsion resin composition was free of the hydrophilic polymer, the content of the silicone-based polymer in the intermediate layer was changed to 100 parts by weight, and a surface of the intermediate layer was subjected to a corona treatment before the separation functional layer was formed thereon.

Reference Example 1

A laminate of Reference Example 1 was obtained in the same manner as in Example 23, except that the surface of the intermediate layer was subjected to no corona treatment and the separation functional layer was omitted.

Comparative Example 1

A separation membrane of Comparative Example 1 was obtained in the same manner as in Example 23, except that a solution (YSR-3022 available from Momentive Performance Materials Inc.) containing a silicone-based polymer was used instead of the emulsion resin composition and the content of the silicone-based polymer in the intermediate layer was changed to 88 parts by weight. Note that the solution containing the silicone-based polymer further contained a curing catalyst and a curing retardant, so that a cure reaction of the silicone-based polymer proceeded when the intermediate layer was produced.

Reference Example 2

A laminate of Reference Example 2 was obtained in the same manner as in Comparative Example 1, except that the surface of the intermediate layer was subjected to no corona treatment and the separation functional layer was omitted.

Example 24

First, 0.7 g of an aqueous emulsion (POLON-MF-56 available from Shin-Etsu Chemical Co., Ltd.) including a silicone-based polymer, 1.2 g of an aqueous slurry including a filler, and 18.1 g of ion exchange water for dilution were mixed to produce 20.0 g of an emulsion resin composition having a solid content concentration of 2 wt %. As the aqueous slurry including a filler, a zeolite aqueous slurry (Zeoal 4A 50 nm aqueous slurry available from Nakamura Choukou Co., Ltd.) was used. Next, by using an applicator (gap: 100 μm), the produced emulsion resin composition was applied onto a porous support member to obtain a coating film. As the porous support member, a UF membrane (ultrafiltration membrane) RS-50 (a laminate of a PVDF porous layer and a PET nonwoven fabric) available from Nitto Denko Corporation was used. The coating film was formed on the PVDF porous layer of the RS-50. The obtained coating film was dried at 130° C. for 10 minutes to form an intermediate layer with a thickness of 2 μm. In the intermediate layer, the content of the silicone-based polymer was 70 parts by weight and the content of the filler was 30 parts by weight.

Next, 0.7 g of a polyether block amide resin (Pebax MH1657 available from Arkema) was put in a mixed solution of 24.0 g of isopropanol and 10.3 g of water and the resultant mixture was stirred at 80° C. for 3 hours to produce 35.0 g of a coating liquid containing the polyether block amide resin at a concentration of 2 wt %. The coating liquid contained 0.01 g of a leveling agent (KP-112 available from Shin-Etsu Chemical Co., Ltd.). By using an applicator (gap: 50 μm), the produced coating liquid was applied onto the intermediate layer to obtain a coating film. Next, the obtained coating film was dried in an oven at 60° C. for 30 minutes to form a separation functional layer. Thus, a separation membrane of Example 24 was obtained.

Examples 25 and 26

Separation membranes of Examples 25 and 26 were obtained in the same manner as in Example 24, except that the type of the filler and the contents of the polymer and filler in the intermediate layer were changed as shown in Table 4.

Example 27

First, water is added to a surfactant to dilute it by a factor of 100. As the surfactant, BYK-347 available from BYK Japan KK was used. Next, 800 g of the obtained diluted solution, 400 g of an aqueous emulsion (POLON-MF-56 available from Shin-Etsu Chemical Co., Ltd.) including a silicone-based polymer, and 900 g of ion exchange water for dilution were mixed to produce 2100 g of an emulsion resin composition having a solid content concentration of 8 wt %. Next, by using a gravure coater (gap: 5 μm), the produced emulsion resin composition was applied onto a porous support member to obtain a coating film. Note that in the case of using a gravure coater, it is necessary to spread the emulsion resin composition thoroughly on a metal roll thereof. In Example 27, in spite of the fact that the solid content concentration of the emulsion resin composition was 8 wt %, which was a relatively low value, no repelling of the emulsion resin composition was observed on the metal roll. The coating film had a thickness (a coating thickness) of 5 μm. As the porous support member, a UF membrane (ultrafiltration membrane) RS-50 (a laminate of a PVDF porous layer and a PET nonwoven fabric) available from Nitto Denko Corporation was used. The coating film was formed on the PVDF porous layer of the RS-50. The obtained coating film was dried at 130° C. for 2.5 minutes to form an intermediate layer with a thickness of 0.5 μm. In the intermediate layer, the content of the silicone-based polymer was 100 parts by weight and the content of the surfactant was 5 parts by weight.

Next, 30 g of a polyether block amide resin (Pebax MH1657 available from Arkema) was put in a mixed solution of 129 g of isopropanol and 441 g of water and the resultant mixture was stirred at 80° C. for 3 hours to produce 1500 g of a coating liquid containing the polyether block amide resin at a concentration of 2 wt %. The coating liquid contained 0.3 g of a leveling agent (KP-112 available from Shin-Etsu Chemical Co., Ltd.). By using an applicator (gap: 50 μm), the produced coating liquid was applied onto the intermediate layer to obtain a coating film. Next, the obtained coating film was dried in an oven at 80° C. for 2.5 minutes to form a separation functional layer.

Thus, a separation membrane of Example 27 was obtained.

Reference Example 3

A laminate of Reference Example 3 was obtained in the same manner as in Example 23, except that the gap of the applicator at the time of forming the intermediate layer was set to 100 μm, the surface of the intermediate layer was subjected to no corona treatment and the separation functional layer was omitted.

[Evaluation on Separation Performance of Intermediate Layer]

Regarding each of Examples, Comparative Examples, and Reference Examples, the separation performance of the intermediate layer was evaluated by the following method. First, a laminate of the intermediate layer and the porous support member obtained before the separation functional layer was formed thereon was cut to prepare three specimens. Each of the specimens was measured for the separation factor α2 for carbon dioxide with respect to nitrogen ($CO_2/N_2$) and the permeation rate T2 of carbon dioxide. Specifically, the specimen was placed in a metal cell, and the metal cell was sealed with an O-ring so that no leakage would occur. Next, a gas mixture was injected into the metal cell such that the gas mixture was in contact with a principal surface, on the intermediate layer side, of the specimen. The gas mixture was composed substantially of carbon dioxide and nitrogen. The concentration of carbon dioxide in the gas mixture was 50 vol % under standard conditions. The gas mixture injected into the metal cell had a temperature of 30° C. and a pressure of 0.1 MPa. Next, a space, in the metal cell, that is adjacent to a principal surface, on the porous support member side, of the specimen was decompressed using a vacuum pump. This space was decompressed in such a manner that a pressure in the space was lower than an atmospheric pressure in a measurement environment by 0.1 kPa. Thus, a permeated fluid was obtained. The separation factor α2 as well as the permeation rate T2 of the carbon dioxide of the specimen were calculated based on the composition of the obtained permeated fluid, the weight of the permeated fluid, etc. In addition, based on the separation factor α2 and the permeation rate T2 of each of the specimens, the coefficient of variation of the separation factor «2 and the coefficient of variation of the permeation rate T2 were determined. Regarding each of Examples 1 to 27 and Reference Examples 1 and 3, the coefficient of variation of the separation factor 2 as well as the coefficient of variation of the permeation rate T2 of the intermediate layer were 0.20 or less. In contrast, regarding each of Comparative Example 1 and Reference Example 2, the coefficient of variation of the separation factor α2 as well as the coefficient of variation of the permeation rate T2 of the intermediate layer were 0.50 or more, which significantly exceeded 0.20. Tables 1 to 4 show the average value of the obtained separation factors α2 and the average value of the permeation rates T2.

[Evaluation on Separation Performance of Separation Membrane]

Regarding each of Examples 1, 4, and 24 to 27 and Comparative Example 1, the separation performance of the separation membrane was also evaluated. The evaluation on the separation performance of the separation membrane was conducted by the same method as that for the evaluation on the separation performance of the intermediate layer, except that the separation membrane was used instead of the laminate of the intermediate layer and the porous support member. Three specimens prepared by cutting the separation membrane were measured for the separation factor α1 for carbon dioxide with respect to nitrogen ($CO_2/N_2$) and the permeation rate T1 of carbon dioxide. Table 5 shows the average value and coefficient of variation of the obtained separation factors α1 and permeation rates T1. Table 5 also shows the average value and coefficient of variation of the separation factors α2 and permeation rates T2 of the intermediate layer in each of Examples 1, 4 and 24 to 27, Comparative Example 1, and Reference Example 2.

[Contact Angle with Respect to Water]

Regarding each of Examples 1 to 23, Comparative Example 1, and Reference Examples 1 and 2, the contact angle of the surface of the intermediate layer with respect to water was measured by the above-mentioned method. For the measurement, a laminate of the intermediate layer and the porous support member obtained before the separation functional layer was formed thereon was used. Tables 1 to 3 show the results.

[Peel Strength P1 of Intermediate Layer with Respect to Porous Support Member]

Regarding each of Examples 1 to 23, Comparative Example 1, and Reference Examples 1 and 2, the peel strength P1 of the intermediate layer with respect to the porous support member was measured by the above-mentioned method. For the measurement, a laminate of the intermediate layer and the porous support member obtained before the separation functional layer was formed thereon was used. Tables 1 to 3 show the results.

[Peel Strength P2 of Separation Functional Layer with Respect to Intermediate Layer]

Regarding the separation membrane of each of Examples 1 to 23 and Comparative Example 1, the peel strength P2 of the separation functional layer with respect to the intermediate layer was measured by the above-mentioned method. Tables 1 to 3 show the results.

[Observation on Defect of Intermediate Layer and Separation Functional Layer]

Figure 4A:
FIG. 4A is an electron microscope image of a surface of an intermediate layer before a separation functional layer is formed thereon in a separation membrane of Comparative Example 1.

Regarding Comparative Example 1, the surface of the intermediate layer was observed with an electron microscope before the separation functional layer was formed thereon. FIG. 4A shows the result. As can be seen from FIG. 4A, a defect (pinhole) was caused on the surface of the intermediate layer in Comparative Example 1.

Figure 4B:
FIG. 4B is an image showing a state after a coloring liquid is applied onto the separation functional layer of the separation membrane of Comparative Example 1.

In addition, a coloring liquid was applied onto the separation functional layer of the separation membrane of Comparative Example 1. Here, the coloring liquid entered into the separation functional layer at points where the defect (pinhole) was present and colored the corresponding points of the separation functional layer. FIG. 4B shows the result. As can be seen from FIG. 4B, in Comparative Example 1, forming the separation functional layer on the intermediate layer having the defect also caused a defect in the separation functional layer.

TABLE 1

| | | | | Example | | | | |
|---|---|---|---|---|---|---|---|---|
| | | | | 1 | 2 | 3 | 4 | 5 |
| Intermediate layer | Silicone-based polymer (parts by weight) | | MF-56 (aqueous emulsion) | 90 | 90 | 90 | 90 | 90 |
| | | | YSR-3022 (solution) | | | | | |
| | Hydrophilic polymer (parts by weight) | Urethane-based polymer | R-2170 (aqueous emulsion) | 10 | | | | |
| | | | DA200 (aqueous emulsion) | | 10 | | | |
| | | | SF470 (aqueous emulsion) | | | 10 | | |
| | | | WLS213 (aqueous emulsion) | | | | 10 | |
| | | | SF420 (aqueous emulsion) | | | | | 10 |
| | | (Meth)acrylic polymer | AP4690N (aqueous emulsion) | | | | | |
| | | (Meth)acrylic urethane-based polymer | WHW-822 (aqueous emulsion) | | | | | |
| | | Ester-based polymer | KT-8803 (aqueous emulsion) | | | | | |

TABLE 1-continued

| | | | | | | | | |
|---|---|---|---|---|---|---|---|---|
| | | Vinyl ester-based polymer | EVA P-3N (aqueous emulsion) | | | | | |
| | Corona treatment | | | Not provided | Not provided | Not provided | Not provided | Not provided |
| | $CO_2$ permeation rate T2 [GPU] | | | 2032 | 4063 | 2085 | 1658 | 2051 |
| | Selectivity α2 ($CO_2/N_2$) [—] | | | 5.5 | 12.0 | 5.4 | 5.2 | 5.7 |
| | Contact angle with respect to water [°] | | | 109.2 | 109.8 | 108.8 | 109.4 | 108.5 |
| | Peel strength P1 of intermediate layer with respect to porous support member [N/18 mm] | | | 0.34 | 0.36 | 0.44 | 0.41 | 0.40 |
| | Peel strength P2 of separation functional layer with respect to intermediate layer [N/10 mm] | | | 3.48 | 2.17 | 3.11 | 3.37 | 2.57 |

| | | | | Example | | | | |
|---|---|---|---|---|---|---|---|---|
| | | | | 6 | 7 | 8 | 9 | 10 |
| Intermediate layer | Silicone-based polymer (parts by weight) | | MF-56 (aqueous emulsion) YSR-3022 (solution) | 90 | 90 | 90 | 90 | 80 |
| | Hydrophilic polymer (parts by weight) | Urethane-based polymer | R-2170 (aqueous emulsion) | | | | | 20 |
| | | | DA200 (aqueous emulsion) | | | | | |
| | | | SF470 (aqueous emulsion) | | | | | |
| | | | WLS213 (aqueous emulsion) | | | | | |
| | | | SF420 (aqueous emulsion) | | | | | |
| | | (Meth)acrylic polymer | AP4690N (aqueous emulsion) | 10 | | | | |
| | | (Meth)acrylic urethane-based polymer | WHW-822 (aqueous emulsion) | | 10 | | | |
| | | Ester-based polymer | KT-8803 (aqueous emulsion) | | | 10 | | |
| | | Vinyl ester-based polymer | EVA P-3N (aqueous emulsion) | | | | 10 | |
| | Corona treatment | | | Not provided | Not provided | Not provided | Not provided | Not provided |
| | $CO_2$ permeation rate T2 [GPU] | | | 1768 | 2536 | 1243 | 1930 | 1205 |
| | Selectivity α2 ($CO_2/N_2$) [—] | | | 6.3 | 3.6 | 7.9 | 4.2 | 7.8 |
| | Contact angle with respect to water [°] | | | 109.3 | 109 | 108.1 | 110.5 | 108.9 |
| | Peel strength P1 of intermediate layer with respect to porous support member [N/18 mm] | | | 0.31 | 0.33 | 0.57 | 0.20 | 0.60 |
| | Peel strength P2 of separation functional layer with respect to intermediate layer [N/10 mm] | | | 1.26 | 0.62 | 1.84 | 0.59 | 3.92 |

TABLE 2

| | | | | Example | | | | | |
|---|---|---|---|---|---|---|---|---|---|
| | | | | 11 | 12 | 13 | 14 | 15 | 16 |
| Intermediate layer | Silicone-based polymer (parts by weight) | | MF-56 (aqueous emulsion) YSR-3022 (solution) | 80 | 80 | 80 | 80 | 80 | 80 |
| | Hydrophilic polymer (parts by weight) | Urethane-based polymer | R-2170 (aqueous emulsion) | | | | | | |
| | | | DA200 (aqueous emulsion) | 20 | | | | | |
| | | | SF470 (aqueous emulsion) | | 20 | | | | |
| | | | WLS213 (aqueous emulsion) | | | 20 | | | |
| | | | SF420 (aqueous emulsion) | | | | 20 | | |

TABLE 2-continued

| | | | | | | | | | |
|---|---|---|---|---|---|---|---|---|---|
| | | (Meth)acrylic polymer | AP4690N (aqueous emulsion) | | | | | 20 | |
| | | (Meth)acrylic urethane-based polymer | WHW-822 (aqueous emulsion) | | | | | | 20 |
| | | Ester-based polymer | KT-8803 (aqueous emulsion) | | | | | | |
| | | Vinyl ester-based polymer | EVA P-3N (aqueous emulsion) | | | | | | |
| Corona treatment | | | | Not provided | Not provided | Not provided | Not provided | Not provided | Not provided |
| $CO_2$ permeation rate T2 [GPU] | | | | 1526 | 1042 | 541 | 1181 | 835 | 1036 |
| Selectivity α2 ($CO_2/N_2$) [—] | | | | 6.5 | 7.9 | 6.6 | 6.3 | 8.6 | 5.7 |
| Contact angle with respect to water [°] | | | | 108.3 | 107.6 | 108.0 | 106.9 | 106.4 | 107.4 |
| Peel strength P1 of intermediate layer with respect to porous support member [N/18 mm] | | | | 0.44 | 0.61 | 0.55 | 0.59 | 0.44 | 0.59 |
| Peel strength P2 of separation functional layer with respect to intermediate layer [N/10 mm] | | | | 4.16 | 4.54 | 4.85 | 4.20 | 4.50 | 4.12 |

| | | | | Example | | | | | |
|---|---|---|---|---|---|---|---|---|---|
| | | | | 17 | 18 | 19 | 20 | 21 | 22 |
| Intermediate layer | Silicone-based polymer (parts by weight) | | MF-56 (aqueous emulsion) | 80 | 80 | 99 | 95 | 70 | |
| | | | YSR-3022 (solution) | | | | | | |
| | Hydrophilic polymer (parts by weight) | Urethane-based polymer | R-2170 (aqueous emulsion) | | | 1 | 5 | 30 | 100 |
| | | | DA200 (aqueous emulsion) | | | | | | |
| | | | SF470 (aqueous emulsion) | | | | | | |
| | | | WLS213 (aqueous emulsion) | | | | | | |
| | | | SF420 (aqueous emulsion) | | | | | | |
| | | (Meth)acrylic polymer | AP4690N (aqueous emulsion) | | | | | | |
| | | (Meth)acrylic urethane-based polymer | WHW-822 (aqueous emulsion) | | | | | | |
| | | Ester-based polymer | KT-8803 (aqueous emulsion) | 20 | | | | | |
| | | Vinyl ester-based polymer | EVA P-3N (aqueous emulsion) | | 20 | | | | |
| Corona treatment | | | | Not provided | Not provided | Not provided | Not provided | Not provided | Not provided |
| $CO_2$ permeation rate T2 [GPU] | | | | 793 | 851 | 2948 | 2126 | 706 | 18 |
| Selectivity α2 ($CO_2/N_2$) [—] | | | | 8.1 | 3.1 | 4.1 | 6.0 | 8.2 | 1.3 |
| Contact angle with respect to water [°] | | | | 106.0 | 109.1 | 111.2 | 110.1 | 105.9 | 84.6 |
| Peel strength P1 of intermediate layer with respect to porous support member [N/18 mm] | | | | 0.63 | 0.23 | 0.12 | 0.18 | 0.79 | 1.78 |
| Peel strength P2 of separation functional layer with respect to intermediate layer [N/10 mm] | | | | 3.98 | 1.07 | 0.41 | 2.12 | 4.49 | 3.94 |

TABLE 3

| | | | | Example 23 | Reference Example 1 | Comparative Example 1 | Reference Example 2 |
|---|---|---|---|---|---|---|---|
| Intermediate layer | Silicone-based polymer (parts by weight) | | MF-56 (aqueous emulsion) | 100 | 100 | | |
| | | | YSR-3022 (solution) | | | 88 | 88 |
| | Hydrophilic polymer (parts by weight) | Urethane-based polymer | R-2170 (aqueous emulsion) | | | | |
| | | | DA200 (aqueous emulsion) | | | | |
| | | | SF470 (aqueous emulsion) | | | | |
| | | | WLS213 (aqueous emulsion) | | | | |
| | | | SF420 (aqueous emulsion) | | | | |

TABLE 3-continued

| | | | Example 23 | Reference Example 1 | Comparative Example 1 | Reference Example 2 |
|---|---|---|---|---|---|---|
| | (Meth)acrylic polymer | AP4690N (aqueous emulsion) | | | | |
| | (Meth)acrylic urethane-based polymer | WHW-822 (aqueous emulsion) | | | | |
| | Ester-based polymer | KT-8803 (aqueous emulsion) | | | | |
| | Vinyl ester-based polymer | EVA P-3N (aqueous emulsion) | | | | |
| Additive (parts by weight) | Curing catalyst | | | | 3 | 3 |
| | Curing retardant | | | | 9 | 9 |
| Corona treatment | | | Provided | Not provided | Provided | Not provided |
| $CO_2$ permeation rate T2 [GPU] | | | 2668 | 2825 | 2131 | 2319 |
| Selectivity $\alpha 2$ ($CO_2/N_2$) [—] | | | 2.4 | 3.6 | 7.6 | 7.2 |
| Contact angle with respect to water [°] | | | 108.0 | 110.4 | 105.3 | 109 |
| Peel strength P1 of intermediate layer with respect to porous support member [N/18 mm] | | | 0.93 | 0.10 | 0.77 | 0 |
| Peel strength P2 of separation functional layer with respect to intermediate layer [N/10 mm] | | | 2.54 | — | 0.35 | — |

TABLE 4

| | | | | | Example 24 | Example 25 | Example 26 | Example 27 | Reference Example 3 |
|---|---|---|---|---|---|---|---|---|---|
| Intermediate layer | Material conditions | Silicone-based polymer (parts by weight) | | MF-56 (aqueous emulsion) | 70 | 80 | 90 | 100 | 100 |
| | | Filler (parts by weight) | Zeolite | 4A (aqueous slurry) | 30 | | | | |
| | | | | ZSM-5 (aqueous slurry) | | 20 | | | |
| | | | Silica | AEROSILOX50 | | | 10 | | |
| | | Additional surfactant (parts by weight) | | BYK-349 | | | | 5 | |
| | Coating conditions | Solid content concentration [wt %] | | | 2 | 2 | 2 | 8 | 2 |
| | | Coating gap [μm] | | | 100 | 100 | 100 | 5 | 100 |
| | | $CO_2$ permeation rate T2 [GPU] | | | 2309 | 4495 | 3255 | 5670 | 1850 |
| | | Selectivity $\alpha 2$ ($CO_2/N_2$) [—] | | | 5.4 | 1.1 | 1.3 | 1.2 | 5.2 |

TABLE 5

| | | Example 1 | Comparative Example 1 | Example 4 | Example 24 | Example 25 | Example 26 | Example 27 | Reference Example 2 |
|---|---|---|---|---|---|---|---|---|---|
| Intermediate layer | $CO_2$ permeation rate T2 [GPU] | 2032 | 2131 | 1658 | 2309 | 4495 | 3255 | 5670 | 2319 |
| | Coefficient of variation of permeation rate T2 [—] | 0.14 | 0.77 | 0.004 | 0.04 | 0.10 | 0.13 | 0.09 | 0.62 |
| | Selectivity $\alpha 2$ ($CO_2/N_2$) [—] | 5.5 | 7.6 | 5.2 | 5.4 | 1.1 | 1.3 | 1.2 | 7.2 |
| | Coefficient of variation of selectivity $\alpha 2$ [—] | 0.06 | 0.51 | 0.03 | 0.05 | 0.03 | 0.03 | 0.004 | 1.0 |
| Separation membrane | $CO_2$ permeation rate T1 [GPU] | 104 | 130 | 91 | 146 | 93 | 58 | 85 | — |
| | Coefficient of variation of permeation rate T1 [—] | 0.048 | 0.18 | 0.01 | 0.03 | 0.04 | 0.003 | 0.02 | — |
| | Selectivity $\alpha 1$ ($CO_2/N_2$) [—] | 49 | 40 | 49 | 45 | 45 | 51 | 45 | — |
| | Coefficient of variation of selectivity $\alpha 1$ [—] | 0.094 | 0.70 | 0.01 | 0.02 | 0.03 | 0.01 | 0.02 | — |

Abbreviations shown in Table 1 to 4 are as follows.

MF-56: POLON-MF-56 available from Shin-Etsu Chemical Co., Ltd.

YSR-3022: YSR-3022 available from Momentive Performance Materials Inc.

R-2170: NeoRez R-2170 available from DSM Coating Resins

DA200: ARACOAT DA200 available from ARAKAWA CHEMICAL INDUSTRIES, LTD.

SF470: SUPERFLEX470 available from DKS Co. Ltd.

WLS213: HYDRAN WLS213 available from DIC CORPORATION

SF420: SUPERFLEX420 available from DKS Co. Ltd.

AP4690N: POLYSOL AP4690N available from Showa Denko K.K.

WHW-822: CERANATE WHW-822 available from DIC CORPORATION

KT-8803: Elitel KT-8803 available from UNITIKA LTD.

EVA P-3N: POLYSOL EVA P-3N available from Showa Denko K.K.

4A: Zeoal 4A 50 nm aqueous slurry (solid content concentration 10 wt %, average particle diameter 50 nm, average pore diameter 0.4 nm, density approximately 2 g/$cm^3$) available from Nakamura Choukou Co., Ltd.

ZSM-5: Zeoal ZSM-5 aqueous slurry (solid content concentration 30 wt %, average particle diameter 100 nm, average pore diameter 0.54 to 0.56 nm, density approximately 2 g/$cm^3$) available from Nakamura Choukou Co., Ltd.

AEROSILOX50: AEROSILOX50 available from NIPPON AEROSIL CO., LTD.

BYK-349: BYK-349 available from BYK Japan KK

As described above, the coefficient of variation of the separation factor α2 and the coefficient of variation of the permeation rate T2 of the intermediate layer in each of Examples 1 to 27 were 0.20 or less, which was smaller than in Comparative Example 1. Furthermore, as can be seen from Table 5, the coefficient of variation of the separation factor α1 and the coefficient of variation of the permeation rate T1 of the separation membrane in each of Examples 1, 4, and 24 to 27, in which the variation in separation performance of the intermediate layer was suppressed, tended to be smaller than in Comparative Example 1. From the results of Table 5, it can be inferred that the variation in separation performance of the separation membrane is more suppressed also in the other Examples than in Comparative Example 1. Note that as can be seen from Examples 24 to 26, the intermediate layer in each of those Examples, which contained a filler, tended to have the permeation rate T2 of carbon dioxide higher than that of the intermediate layer in Reference Example 3.

INDUSTRIAL APPLICABILITY

The separation membrane of the present embodiment is suitable for separating an acid gas from a gas mixture containing the acid gas. In particular, the separation membrane of the present embodiment is suitable for separating carbon dioxide from an off-gas of a chemical plant or a thermal power plant.

The invention claimed is:

1. A separation membrane comprising:

a separation functional layer;

a porous support member supporting the separation functional layer; and an intermediate layer that is disposed between the separation functional layer and the porous support member and is formed from an emulsion resin composition, wherein the intermediate layer includes at least one selected from the group consisting of a silicone-based polymer and a hydrophilic polymer.

2. The separation membrane according to claim 1, wherein the hydrophilic polymer includes at least one selected from the group consisting of a urethane-based polymer, a (meth)acrylic polymer, a (meth)acrylic urethane-based polymer, an ester-based polymer, and a vinyl ester-based polymer.

3. The separation membrane according to claim 1, wherein a content of the hydrophilic polymer in the intermediate layer is 10 wt % to 20 wt %.

4. The separation membrane according to claim 1, wherein the emulsion resin composition includes water as a dispersion medium.

5. The separation membrane according to claim 1, wherein the emulsion resin composition includes a surfactant.

6. The separation membrane according to claim 5, wherein a ratio of a weight of the surfactant with respect to a weight of a total solid content in the emulsion resin composition is 15 wt % or less.

7. The separation membrane according to claim 1, wherein the intermediate layer includes a filler.

8. The separation membrane according to claim 7, wherein the filler has a particle shape and an average particle diameter smaller than a thickness of the intermediate layer.

9. The separation membrane according to claim 1, wherein the separation functional layer includes a polyether block amide resin.

10. The separation membrane according to claim 1, wherein the porous support member includes polyvinylidene fluoride.

11. The separation membrane according to claim 1, wherein the intermediate layer has a thickness of 10 μm or less.

12. The separation membrane according to claim 1, wherein the separation functional layer has a peel strength of 3.0 N/10 mm or more with respect to the intermediate layer.

13. The separation membrane according to claim 1, wherein the separation membrane is used for separating carbon dioxide from a gas mixture containing carbon dioxide and nitrogen.

14. A method for manufacturing a separation membrane including a separation functional layer, a porous support member supporting the separation functional layer, and an intermediate layer that is disposed between the separation functional layer and the porous support member, the method comprising:

applying an emulsion resin composition onto the porous support member and thereby forming a coating film; and drying the coating film and thereby forming the intermediate layer, wherein the emulsion resin composition includes at least one selected from the group consisting of a silicone-based polymer and a hydrophilic polymer.

15. A separation membrane comprising:

a separation functional layer;

a porous support member supporting the separation functional layer; and an intermediate layer that is disposed between the separation functional layer and the porous support member and includes a silicone-based polymer and a hydrophilic polymer.

* * * * *